US012101695B2

(12) United States Patent      (10) Patent No.: US 12,101,695 B2
Crowley et al.      (45) Date of Patent: ***Sep. 24, 2024

(54) LOCATION-BASED SOCIAL SOFTWARE FOR MOBILE DEVICES

(71) Applicant: Google LLC, Mountain View, CA (US)

(72) Inventors: Dennis P. Crowley, NY, NY (US); Alexander M. Rainert, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/305,262

(22) Filed: Apr. 21, 2023

(65) Prior Publication Data

US 2023/0345208 A1     Oct. 26, 2023

Related U.S. Application Data

(63) Continuation of application No. 17/327,448, filed on May 21, 2021, now Pat. No. 11,653,179, which is a (Continued)

(51) Int. Cl.
     *H04W 4/029*      (2018.01)
     *H04L 51/00*      (2022.01)
     (Continued)

(52) U.S. Cl.
     CPC ............. *H04W 4/029* (2018.02); *H04L 51/00* (2013.01); *H04L 51/222* (2022.05); *H04L 51/52* (2022.05);
     (Continued)

(58) Field of Classification Search
     CPC ....... H04W 4/029; H04W 4/023; H04W 4/12; H04L 51/222; H04L 67/52; H04L 51/52; (Continued)

(56) References Cited

U.S. PATENT DOCUMENTS 5,764,916 A    6/1998   Busey et al.
6,044,372 A    3/2000   Rothfus et al.
(Continued)

FOREIGN PATENT DOCUMENTS

CN      1299203      6/2001
EP      1176840      1/2002
(Continued)

OTHER PUBLICATIONS

"A Posse That Fits in the Palm of Your Hand," Time, May 31, 2004, 2 pages.

(Continued)

*Primary Examiner* — John J Lee
(74) *Attorney, Agent, or Firm* — Fish & Richardson P.C.

(57) ABSTRACT

A method for communicating location information to a device includes receiving, at a computer system that implements a social networking service, location information that represents a geographic location of a device associated with a first user; associating, by the computer system, the received location information with a profile associated with the first user; and sending, from the computer system to a device associated with a second user, a message that is generated based at least in part on the location information.

15 Claims, 18 Drawing Sheets

Related U.S. Application Data continuation of application No. 16/555,758, filed on Aug. 29, 2019, now Pat. No. 11,051,130, which is a continuation of application No. 16/198,195, filed on Nov. 21, 2018, now Pat. No. 10,440,502, which is a continuation of application No. 15/651,880, filed on Jul. 17, 2017, now Pat. No. 10,142,770, which is a continuation of application No. 15/131,453, filed on Apr. 18, 2016, now Pat. No. 9,712,958, which is a continuation of application No. 13/784,700, filed on Mar. 4, 2013, now Pat. No. 9,319,832, which is a continuation of application No. 13/621,118, filed on Sep. 15, 2012, now Pat. No. 8,670,786, which is a continuation of application No. 13/526,458, filed on Jun. 18, 2012, now Pat. No. 8,676,173, which is a continuation of application No. 12/564,661, filed on Sep. 22, 2009, now Pat. No. 8,204,513, which is a continuation of application No. 11/126,762, filed on May 11, 2005, now Pat. No. 7,593,740.

(60) Provisional application No. 60/570,410, filed on May 12, 2004.

(51) Int. Cl.
| | | |
|---|---|---|
| *H04L 51/222* | (2022.01) | |
| *H04L 51/52* | (2022.01) | |
| *H04L 67/52* | (2022.01) | |
| *H04M 3/42* | (2006.01) | |
| *H04W 4/02* | (2018.01) | |
| *H04W 4/12* | (2009.01) | |
| *H04W 4/06* | (2009.01) | |
| *H04W 8/08* | (2009.01) | |
| *H04W 8/14* | (2009.01) | |

(52) U.S. Cl.
CPC ............ *H04L 67/52* (2022.05); *H04M 3/42* (2013.01); *H04M 3/42374* (2013.01); *H04W 4/02* (2013.01); *H04W 4/023* (2013.01); *H04W 4/12* (2013.01); *H04M 2203/2044* (2013.01); *H04M 2203/205* (2013.01); *H04M 2203/2094* (2013.01); *H04M 2242/14* (2013.01); *H04M 2242/30* (2013.01); *H04W 4/06* (2013.01); *H04W 8/08* (2013.01); *H04W 8/14* (2013.01)

(58) Field of Classification Search
CPC ............ H04L 51/00; H04M 3/42374; H04M 2203/2044; H04M 2203/2094; H04M 2242/30; H04M 2242/14
See application file for complete search history.

(56) References Cited

U.S. PATENT DOCUMENTS

| | | | |
|---|---|---|---|
| 6,102,406 A | 8/2000 | Miles et al. | |
| 6,421,669 B1 | 7/2002 | Gilmour et al. | |
| 6,549,768 B1 | 4/2003 | Fraccaroli | |
| 6,618,593 B1 | 9/2003 | Drutman et al. | |
| 7,069,308 B2 | 6/2006 | Abrams | |
| 7,117,254 B2 | 10/2006 | Lunt et al. | |
| 7,188,153 B2 | 3/2007 | Lunt et al. | |
| 7,310,676 B2* | 12/2007 | Bourne | H04L 51/58 709/227 |
| 7,373,422 B1 | 5/2008 | Paul et al. | |
| 7,451,161 B2 | 11/2008 | Zhu et al. | |
| 7,478,078 B2 | 1/2009 | Lunt et al. | |
| 7,489,979 B2 | 2/2009 | Rosenberg | |
| 7,590,661 B2 | 9/2009 | Regnier | |
| 7,590,691 B2 | 9/2009 | Gonsalves et al. | |
| 7,606,687 B2 | 10/2009 | Galbreath et al. | |
| 7,680,882 B2 | 3/2010 | Tiu, Jr. et al. | |
| 7,788,340 B2 | 8/2010 | Jolley et al. | |
| 7,860,928 B1 | 12/2010 | Anderson | |
| 7,873,722 B2 | 1/2011 | Paul et al. | |
| 8,019,692 B2* | 9/2011 | Rosen | G06Q 30/08 705/319 |
| 8,276,081 B2* | 9/2012 | Boyd | G06Q 10/109 715/751 |
| 8,321,546 B2 | 11/2012 | Regnier et al. | |
| 8,346,223 B1 | 1/2013 | Byrnes et al. | |
| 2003/0162555 A1 | 8/2003 | Loveland | |
| 2003/0200192 A1 | 10/2003 | Bell | |
| 2004/0189476 A1 | 9/2004 | Borovoy et al. | |
| 2004/0215793 A1 | 10/2004 | Ryan et al. | |
| 2004/0235493 A1 | 11/2004 | Ekerborn | |
| 2004/0259641 A1 | 12/2004 | Ho | |
| 2005/0003804 A1 | 1/2005 | Huomo | |
| 2005/0021750 A1 | 1/2005 | Abrams | |
| 2005/0174975 A1 | 8/2005 | Mgrdechian et al. | |
| 2005/0177614 A1 | 8/2005 | Bourne | |
| 2005/0250516 A1 | 11/2005 | Shim | |
| 2006/0003804 A1 | 1/2006 | Liu | |
| 2006/0080283 A1 | 4/2006 | Shipman | |
| 2007/0233726 A1 | 10/2007 | Torrens et al. | |
| 2007/0281689 A1 | 12/2007 | Altman et al. | |

FOREIGN PATENT DOCUMENTS

| | | |
|---|---|---|
| EP | 1376430 | 1/2004 |
| WO | WO 2003030051 | 4/2003 |

OTHER PUBLICATIONS

"Automate Your Nightlife. With Dodgeball.com, You May Never Drink Alone Again," Mobile PC, Oct. 2004, 1 page.
"Cell Phone Tag," Philadelphia Citypaper.net, at http://citypaper.net/articles/2004-09-23/naked.shtml, Sep. 23-29, 2004, 2 pages.
"Coming Together," Newsweek, Nov. 1, 2004, 2 pages.
"Community Chest," LA Weekly, at http://www.dodgeball.com/press/laweekly.php, Aug. 6-12, 2004, 2 pages.
"Dodgeball Expanding," at http://smartmobs.com/archive/2004/04/20/dodgeball_expan.html, Apr. 20, 2004, 1 page.
"Dodgeball.com is like Friendster for your mobile phone," at http://www.esato.com/board/viewtopic.php?topic=55533, Apr. 7, 2004, 1 page.
"Dodgeball.com is like Friendster for your mobile phone," at http://www.smartfone.net/19/435.html, Apr. 7, 2004, 2 pages.
"Dodgeball.com Sets Friends in Motion," NPR, at http://www.npr.org/templates/story/story.php?storyId=3866348, Aug. 23, 2004, 1 page.
"Dodgeball.com," at http://www.zephoria.org/thoughts/archives/2004/04/07/dodgeballcom.html, Apr. 7, 2004, 1 page.
"Dodgeball. Social Beta Launch . . . ," at http://wireless.weblogsinc.com/entry/1365141061548149/, Apr. 6, 2004, 2 pages.
"Dodgeball.social," at http://www.smartmobs.com/archive/2004/04/06/dodgeballsocia.html, Apr. 6, 2004, 1 page.
"Dodgeball.social . . . NJASNT (Not Just Another Social Networking Tool)," at http://www.splatt.com/au/blog/archives/000329.html, Apr. 7, 2004, 1 page.
"Dodgeball" at http://weblogs.macromedia.com/jd/archives/2004/04/dodgeball.cfm, Apr. 20, 2004, 1 page.
"For More Advertisers, the Medium Is the Text Message," The Wall Street Journal, Aug. 2, 2004, 1 page.
"Friends for Mobile Phones' Expands," at http://www.textually.org/textually/archives/2004/003575.htm, Apr. 20, 2004, 1 page.
"Friendster for your mobile phone," at http://www.kottke.org/remainder/04/04/5343.html, Apr. 6, 2004, 3 pages.
"Friendster for your mobile phone," at http://www.trendcentral.com/trends/trendarticle/asp?tcAticleId=1082, printed Jul. 21, 2005, 1 page.
"Giving serendipity a nudge," Newsday, Sep. 7, 2004, 2 pages.
"Jargon Watch," Wired, Jul. 2004, 2 pages.

(56) References Cited

OTHER PUBLICATIONS

"Language of Love for the High-Tech Set," at http://foxnews.com/printer_friendly_story/0,3566,120921,00.html, May 27, 2004, 2 pages.
"Mobile Beacons," at http://socialtwister.com/archives/000132.html, Apr. 7, 2004, 1 page.
"Mobile Dodgeball," The San Diego Union-Tribune, at http://signonsandiego.printthis.clickability.com/pt/cpt?action=cpt&title=Site+seeing+%7C . . . , 1 page, Sep. 27, 2004.
"Mobile Party Finder," Wired, Jun. 2004, 2 pages.
"Mobile phone tag," Red Herring, at http://www.redherring.com/PrintArticle/aspx?a=10792&sector=Industries, Aug. 11, 2004, 3 pages.
"More Remainders: Dodgeball = Phonester," at http://www.gawker.com/topic/more_remainders_dodgeball_phonester_014834.php, Apr. 7, 2004, 1 page.
"MoSoSo", at http://crystaltips.typepad.com/wonderland/2004/04/dodgeball.html, Apr. 2004, 3 pages.
"MoSoSo", at http://www.boingboing.net/2004/04/13/mososo.html, Apr. 13, 2004, 1 page.
"Network Rivalry. With technology, meeting people is a lot easier than getting rid of them," at http://www.printthis.clickability.com/pt/cpt?action=cpt&title=Dodgeball+-+A+New+Tech . . . , 2 pages, printed Jul. 20, 2005.
"New Cell Phone Services Can Help Manage Your Social Life," at http://www.ny1.com/ny1/content/index.jsp?stid=101&aid=49781, Apr. 6, 2005, 2 pages.
"Only Disconnect. What the man who gave us the answering machine means to the story of technological avoidance," The New York Times Magazine, Dec. 26, 2004, 2 pages.
"Roger Dodger," Los Angeles Magazine, Aug. 2004, 1 page.
"So Happy Together," Newsweek, May 10, 2004, 2 pages.
"Social Lives of a Cell Phone," TechnologyReview.com, at http://www.technologyreview.com/articles/04/07/wo_bender071204.asp?p=0, Jul. 12, 2004, 3 pages.
"Spotlight. On the Move. What will shape our mobile lifestyle in 2005," Fast Forward 2005, Nov. 2004, 2 pages.
"That's what friends R 4," Wireless Review, at http://wirelessreview.com/art/wireless thats_friends, Jun. 1, 2004, 2 pages.
"The Dodgeball circle expands," at http://www.engadget.com/entry/4979865886576287/, Apr. 21, 2004, 2 pages.
"The Future of Wireless," CORANTE, at http://www.corante.com/vision/wireless/dodgeball.php, 6 pages, printed Jul. 21, 2005.
"We R @ Star Shoes, send reinforcements," The Los Angeles Times, Jul. 8, 2004, 2 pages.
Adamic, Lada A., Orkut Buyukkokten, and Eytan Adar. "A Social Network Caught in the Web." California, 2003. (22 pages).
Agarwal, Prateek and Sameer Madan. "Enabling Real-Time Suer Interests for Next Generation Activity-Oriented Social Networks." Department of Computer Science & Engineering; Indian Institute of Technology Delhi, 2008. (66 pages).
AppAppeal. "Yahoo! 360 Review." [Retrieved on Oct. 18, 2011]. Retrieved from the Internet: <URL: http://www.appappeal.com/app/yahoo-360/> (3 pages).
Baig, "Love growing strong on Web," USA Today, at http://usatoday1.printthis.clickability.compt/cpt?action=cpt&title=USATODAY.com+-+Lo . . . , 4 pages, printed Jul. 21, 2005.
Baird, Derek E. and Mercedes Fisher. "Neomillennial User Experience Design Strategies: Utilizing Social Networking Media to Support "Always on" Learning Styles." J. Educational Technology Systems, vol. 34(1) 5-32, 2005-2006. (28 pages).
Boyd, Danah M. and Nicol B. Ellison. "Social Network Sites: Definition, History, and Scholarship." Journal of Computer-Mediated Communication, 2008. (21 pages).
Chapell, "2005 Privacy & Marketing Predictions," iMedia Connection, at http://www.imediaconnection.com/content/4881.asp, 3 pages, printed Jul. 21, 2005.
Chinese Office Action in CN App. No. 201010170574.5, mailed Nov. 3, 2011, 8 pages.
Chinese Office Action in CN App. Ser. No. 200580023295.3, mailed May 17, 2011, 7 pages.
Chinese Office Action in CN App. Ser. No. 201010170574.5 dated Mar. 29, 2013, 7 pages.
Chinese Office Action in CN. App. No. 200580023295.3, mailed Oct. 30, 2009, 8 pages.
Churchill, Elizabeth F. and Christine A. Halverson. "Social Networks and Social Networking." IEEE Computer Society, Sep.-Oct. 2005. (6 pages).
Cohen, Tracy and Ben Clemens. "Social Networks for Creative Collaboration." C&C, Apr. 12-15, 2005; London, United Kingdom. (4 pages).
Decker, Stefan and Martin Frank. "The Social Semantic Desktop." DERI Technical Report May 2, 2004. (7 pages).
Dixit, "The Artful-and Mobile-Dodger," IEEE Spectrum Online, at http://dodgeball.com/press/ieee/, 3 pages, printed Jul. 20, 2005.
Dodgeball. "Help: The Basics." [retrieved on Sep. 18, 2013] Retrieved from the Internet: <URL:http://web.archive.org/web/20040516063058/http://dodgeball.com/social/help basics.php>.
Dodgeball.com. "About Dodgeball.com" [retrieved on Feb. 21, 2009] Retrieved from the Internet: <URL:http://web.archive.org/web/20031206011504/dodgeball.com/mktg_about.php>.
Dodgeball.com. "Create a circle and invite your friends." [retrieved on Feb. 21, 2009] Retrieved from the Internet: <URL:http://web.archive.org/web/20031207092536/dodgeball.com/main_circles.php>.
Dodgeball.com. "Home Page." [retrieved on Feb. 21, 2009] Retrieved from the Internet: <URL:http://web.archive.org/web/201109202500/www.dodgeball.com/city/>.
Dodgeball.com. "Join Dodgeball Circles." [retrieved on Feb. 21, 2009] Retrieved from the Internet: <URL:http://web.archive.org/web/20030803174729/www.dodgeball.com/city/circles/join.asp>.
Dodgeball.com. "New York City Edition." [retrieved on Feb. 21, 2009] Retrieved from the Internet: <URL:http://web.archive.org/web20040102160151/http://dodgeball.com/>.
Eagle, Nathan and Alex Pentland. "Social Serendipity: Proximity Sensing and Cueing." MIT Media Laboratory Technical Note 580, May 2004. (18 pages).
Erickson, Thomas and Wendy A. Kellogg. "Social Translucence: Using Minimalist Visualization of Social Activity to Support Collective Interaction." Designing Information Spaces: The Social Navigation Approach, Springer-Verlag: London, 2003. (19 pages).
European Office Action in EP App. No. 05 747 447.0-2413, mailed Dec. 29, 2010, 7 pages.
European Office Action in EP App. No. 05 747 447.0, dated Jun. 3, 2013, 4 pages.
European Office Action in European Appln. 05747447.0, dated Feb. 14, 2019, 2 pages.
European Search Report for application No. 13150563.8 mailed Jun. 4, 2013, 5 pages.
European Supplementary Search Report for Application No. PCT/US2005/016605, dated Sep. 7, 2010, 4 pages.
Flickr. "The Dodgeball Shut-Down Party." [retrieved on Feb. 21, 2009] Retrieved from the Internet: <URL:http://flickr.com/photos/dpstyles/3294855253/>.
Frauenfelder, "The Wireless Hook-Up," at http://www.thefeaturearchvies.com/topic/Culture/The_Wireless_Hook-Up.html, Jan. 7, 2004, 2 pages.
Freeband. "We-Centric, Context-Aware, Adaptive Mobile Service Bundles: Defining Concepts, Functionalities and Research Questions." Freeband, Nov. 30, 2004. (48 pages).
Hammond, Tony, Timo Hannay, Bend Lund, and Joanna Scott. "Social Bookmarking Tools (I): A General Review." D-Lib Magazine, Apr. 2005. (23 pages).
Heer, Jeffrey and Danah Boyd. "Vizster: Visualizing Online Social Networks." University of California, Berkeley; 2005. (8 pages).
Indian Examination Report for IN App. No. 1427/MUMNP/2006, dated Oct. 28, 2009, 5 pages.
Kandel, "A Mobile Link for 90 Mutual Friends," The New York Times, May 13, 2004, 3 pages.
Korean Office Action in KR. App. No. 2006/7026144, mailed Sep. 14, 2010, 8 pages.
Leonard, Andrew. "You Are Who You Know." Salon.com, Jun. 15, 2004. (15 pages).

(56) References Cited

OTHER PUBLICATIONS

LiveJournal. "FAQ Question #163: How do I find a syndicated account?" Jan. 6, 2004. (2 pages).

Lockheed-Martin Corporation. "Battlefield Awareness and Data Dissemination Intelligent Information Dissemination Server." Final Technical Report, Nov. 1999. (31 pages).

Marwick, Alic Emily. "Selling Your Self: Online Identity in the Age of a Commodified Internet." University of Washington, 2005. (192 pages).

Metcalf, Sara and Mark Paich. "Spatial Dynamics of Social Network Evolution." International Conference of the System Dynamics Society, Jul. 19, 2005. (13 pages).

Mori, Junichiro, Tatsuhiko Sugiyama, and Yutaka Matsuo. "Real-World Oriented Information Sharing Using Social Networks." GROUP, Nov. 6-9, 2005; Sanibel Island, Florida. (4 pages).

MySpace Friend Feeds. "Add MySpace Friends to your Blog." Apr. 2, 2006. (1 page).

Nardi, Bonnie A., Diane J. Schiano, and Michelle Gumbrecht. "Blogging as Social Activity, or, Would You Let 900 Million People Read Your Diary?" CSCW, Nov. 6-10, 2004; Chicago, Illinois. (10 pages).

Neumann, Marco, Ina O'Murchu, John Breslin, Stefan Decker, Deirdre Hogan, and Giaran MacDonaill. "Semantic Social Network Portal for Collaborative Online Communities." Emerald; Journal of European Industrial Training, vol. 29, No. 6, 2005. (15 pages).

O'Murchu, Ina, John G. Breslin, and Stefan Decker. "Online Social and Business Networking Communities." DERI Technical Report, Aug. 11, 2004. (22 pages).

Rojas, Peter. "Like Friendster for your cellphone." Apr. 7, 2004 [Retrieved Dec. 7, 2010] Retrieved from the Internet <URL: http://www.engadget.com/2004/04/07/like-friendster-for-your-cellphone/> (3 pages).

Roush, "Social Machines," Technology Review, Aug. 2005, 11 pages.

Spanbauer and Bass, "The New Web Challengers," PC World, at http://www.pcworld.com/resource/printable/article/0,aid,118794,00.asp, 10 pages, Feb. 2005.

Steen, Marc. "Development of We-Centric, Content-Aware, Adaptive Mobile Services Requires Empathy and Dialogue." Freeband FRUX, 2005. (4 pages).

Stephenson, "10 homeland security technologies to watch in 2005," at http://www.stephensonstrategies.com/stories/2005/01/05/10HomelandSecurityTechnolo.ht . . . , 4 pages, printed Jul. 2, 2005.

Sweetingham, "Circle line. Let your cell phone keep tabs on your friends," Time Out NY, Dec. 4-11, 2003, p. 174.

Terdiman, "MoSoSos Not So So-So," Wired News, at http://www.wired.com/news/culture/0,1284,66813,00.html?tw=rss.TOP, Mar. 8, 2005, 3 pages.

Wenger, Etienne, Nancy White, John D. Smith, and Kim Row. "Technology for Communities." CEFRIO Book Chapter, Jan. 18, 2005. (15 pages).

Wikipedia. "Yahoo! 360." [Retrieved on Oct. 18, 2011]. Retrieved from the Internet: <URL: http://en.wikipedia.org/wiki/Yahoo!_360 >, (4 pages).

* cited by examiner dodgeball hook up | Search Venues [ ] go

[home] [invite friends] [my profile] [manager] [history] [crush list] [people venues] [prefs] [help]

You are logged in as donpablo in New York City [logout]   Suggestions? Bugs? Send them here.
You won't get messages from dodgeball until you activate your phone. Click here to activate!

test your phone

So, you didn't receive our text message, eh?

No worries - you can still send us text messages which means you can broadcast your location to your friends, just not receive on their location of your friends and their friends.

- Learn more about how to use dodgeball.com.
- Start adding and inviting friends to join.

If you are convinced that you have text-messaging and want to try again, then doublecheck the following...

- Check to make sure your phone is on.
- Double-check your phone's display to see if you have a new text message.
- Check with your provider to make sure you are subscribed to their text messaging service.
- And... if you finally did receive our test message, click here.

home|about us|press|contact|logout|Copyright © 2005, dodgeball.com. Patent Pending.

FIG. 10

SPREAD THE FLAVOR
ADD FLAVORP_L AS YOUR FRIEND tools

RSS
generate an RSS feed of your check-ins

EXPORT
export my friends to a FOAF file delete me
To delete your dodgeball.com account, click here.

Don's friends
Sorry, but we don't know who your friends are yet. Add friends by browsing current users, or inviting new friends.
(Remember, friends aren't "connected" until both approve the request.)

friends who are outside my homecity (New York City)
You don't have friends in any other cities.

friends I am Not Sending Messages To
You are not blocking any of your friends.
To prevent friend from sending or receiving messages from you, click manage friends. (sssh-we won't tell them)

Don's friends of friends
Sorry, you are not connected to any friends-of-friends.
As you connect yourself to more people, friends-of-friends will start to appear.

home | about us | press | contact | logout | Copyright © 2005, dodgeball.com. Patent Pending.

Jeni on Divas : (05.01.2005)
This place has an atmosphere that can go romantic or friendly-hand-out very easily. Steady latin music plays at a volume that still allows conversation and the staff is always very accommodating. If for nothing else, come for the creative martini menu, great endive salad and lobster raviolis.

Jeni on L'Express : (05.01.2005)
There's a reason this place is busy at all hours of the night- the atmosphere is lively, the food is great, and the wine list is nothing to laugh at. Do yourself a favor and pass up pizza and diner food at 3 in the morning and head for L'Express

Jeni on Remote lounge : (05.01.2005)
Lights, camera...no action. If you're at this bar, chances are its your first time and your first time and you came out of curiosity after hearing about their tv-meeting theme. It will take about 15 minutes for that curiosity to wear off so don't plan on staying long.

Leanne on AER : (04.30.2005)
The lower level is so lovely.

Leanne on Gypsy Tea : (04.30.2005)
Seems to me this club has something for everyone. It's pretty and fun.

Collective Unconscious
279 Church Street
added by: alex

Ritz Carlton Battery Park
2 West St
added by: alex added by: Jaime

Scratchers
209 east 5th street
added by: Chris

 home | about us | press | contact | logout   Copyright © 2005, dodgeball.com. Patent Pending.

FIG. 15 (Cont.)

ately easy, and very efficient.

LOCATION-BASED SOCIAL SOFTWARE FOR MOBILE DEVICES

CROSS-REFERENCE TO RELATED APPLICATIONS

This application is a continuation of, and claims priority to, pending U.S. patent application Ser. No. 17/327,448, filed May 21, 2021, entitled "Location-Based Social Software for Mobile Devices," which is a continuation of, and claims priority to, pending U.S. patent application Ser. No. 16/555,758, now U.S. Pat. No. 11,051,130, filed Aug. 29, 2019, entitled "Location-Based Social Software for Mobile Devices," which is a continuation of, and claims priority to, pending U.S. patent application Ser. No. 16/198,195, now U.S. Pat. No. 10,440,502, filed Nov. 21, 2018, entitled "Location-Based Social Software for Mobile Devices," which is a continuation of, and claims priority to, pending Ser. No. 15/651,880, now U.S. Pat. No. 10,142,770, filed Jul. 17, 2017, entitled "Location-Based Social Software for Mobile Devices," which is a continuation of, and claims priority to, U.S. patent application Ser. No. 15/131,453, now U.S. Pat. No. 9,712,958, filed Apr. 18, 2016, entitled "Location-Based Social Software for Mobile Devices," which is a continuation of, and claims priority to, U.S. patent application Ser. No. 13/784,700, now U.S. Pat. No. 9,319,832, filed Mar. 4, 2013, entitled "Location-Based Social Software for Mobile Devices," which is a continuation of, and claims priority to, U.S. patent application Ser. No. 13/621,118, now U.S. Pat. No. 8,670,786, filed Sep. 15, 2012, entitled "Location-Based Social Software for Mobile Devices," which is a continuation of, and claims priority to, U.S. patent application Ser. No. 13/526,458, now U.S. Pat. No. 8,676,173, filed on Jun. 18, 2012, entitled "Local Social Awards," which is a continuation of, and claims priority to, U.S. patent application Ser. No. 12/564,661, now U.S. Pat. No. 8,204,513, filed on Sep. 22, 2009, entitled "Location-Based Social Software for Mobile Devices," which is a continuation of, and claims priority to, U.S. patent application Ser. No. 11/126,762, now U.S. Pat. No. 7,593,740, filed on May 11, 2005, entitled "Location-Based Social Software for Mobile Devices," which claims the benefit under 35 U.S.C. § 119(e) of U.S. Patent Application No. 60/570,410 filed on May 12, 2004. The disclosure of each of the foregoing applications is incorporated herein by reference.

TECHNICAL FIELD

This invention relates to systems and methods for connecting people to each other, and more particularly to connections of acquaintances for activities such as socialization.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

People are social creatures—some more social than others. We express this socialization through relationships, and we carry it out through communication. Many communication techniques have been used—from direct dialogue to smoke signals to telegraph to telephone and wireless communications, such as cellular telephone. Modern technological modes of communication are very convenient, very easy to use, and very efficient.

However, establishing the communication is not always easy. Such a step generally involves getting all the people for communication on a single communication channel, whether in the same room, on a single phone call, or whatever—often termed as a "meeting" in a business context or perhaps a "party" or "confab" in a social context. Setting up the meeting or party is not so easy, however. The process may require sending out invitations, either by paper or electronically. The organizer may then need to tally up any responses to determine who will be coming. Alternatively, an electronic system such as a meeting scheduler can keep track of responses. Another way to set up a meeting or party is simply to contact each invitee directly (or by having a helper do so), such as through numerous telephone calls or e-mails messages. Such a process can be rather time consuming, and is perhaps too much work for a spontaneous get-together. Certain on-line systems also can help organize a party, keeping track of RSVP's and other information. Yet these too require advance planning and fairly involved organization. In addition, many of these systems require the organizer to select attendees from a manually-created list of acquaintances, such as members of an e-mail address book.

SUMMARY

This document discloses systems and methods for allowing acquaintances to find each other so that they can get together, and perhaps have a good time. In general, users of a system may employ portable devices, such as e-mail or text-message enabled telephones, to identify their location to their acquaintances, such as through a server that keeps track of relationships established between users. The system may also determine the distance between users so that only users in close proximity to each other trade communications. In this way, users do not receive communications if it is impracticable for them to establish a meeting with their acquaintance or acquaintances.

In some embodiments, such a system may have a number of advantages. For example, a system may allow for convenient communication among friends who like to socialize but do not want to plan every outing. The system may also allow for spontaneous socializing, where friends who were not thinking of being with each other end up together for a fun evening. In addition, a system may help avoid the problem of friends who were out near each other, but never realized it until later. In general, the system has the ability to turn an otherwise lackluster evening into a very fun night on the town. Also, the system may be extended using well-known social networking approaches to allow for communications, not only with direct friends, but with friends of friends and other further relations. In addition, people may be related to others by the system according to interests provided by each user or inferred by the system. As such, a particular evening may be improved for a user, and by meeting additional people, the person's entire social life can be improved. No more sitting alone and lonely. One embodiment of such a system can be found at the Dodgeball web site, hosted at www.dodgeball.com. This system is directed to location-based social software for mobile devices, such as cellular telephones. The system provides a unique means by which friends can register themselves with the system, so that the system knows who their acquaintances are or should be. The user may then identify their location, and receive information about the status of nearby friends, while those nearby friends learn the status of the user. When integrated with features such as coordination of reviews of various venues, and the ability to send a message by shouting it out to one's friends, this system has drawn a number of users recently and a number of positive comments.

In one aspect, a method is disclosed for establishing connection between users of mobile devices. The method comprises receiving at a computer a location of a first user from a first mobile device, receiving from a second mobile device a location of a second user having an acquaintance relationship to the first user, and sending a message to the first mobile device based on the proximity of the first user to the second user. The user locations may be determined by converting a location proxy (which may comprise a venue name) to a set of corresponding location coordinates, which may comprise GPS coordinates. The venue name may be parsed form an electronic mail message, and the electronic mail message may be parsed into components from a MIME header. The message may also be sent over a text messaging system.

In some aspects, the acquaintance relationship may be a friend relationship or a friend-of-a-friend relationship. The location of the first user may also be retired a predetermined time after receiving the location of the first user, so that other users may no longer learn the location of the first user. In addition a message to the second mobile device may be blocked based on a selection by the first user to hide from the second user.

In yet other aspects, a venue review may be received from a third user and the review may be made available to the first user and the second user. In addition, a message may be sent to the second mobile device based on the proximity of the users to each other. Also, the first sent message may provide the identity of the second user, and the second sent message may provide an indication that another user is in the proximity of the second user, without providing the identity of the first user.

In another aspect, a system for providing information about acquaintances is provided. The system may include an interface to receiving messages from users of the system providing information associated with their location, a location engine configured to correlate the received location information to a location identifier that may be compared to other location identifiers, an acquaintance identifier configured to identify acquaintances of users providing location information to the system, and a message generator to prepare messages to users regarding the locations of their acquaintances if those locations are proximate to the users. The interface may comprise an e-mail in box, and the location engine may comprise a table that correlates venue names to geographic coordinates. The message generator may be configured to prepare a first message for a first user about the location of a second user who is identified as a friend of the first user, and to prepare a message for the second user about the location of the first user. In addition, the message generator may be responsive to instructions from the location engine and the acquaintance identifier so that the message generator only prepares messages for users of a predetermined relationship and in a particular geographic area. The message generator may also be configured to prepare a plurality of messages for a plurality of users identified as friends of a first user, when the first user requests that messages be addressed to the friends of the first user.

In another example, a system for providing information about acquaintances is disclosed. The system may include an interface to receive a message from a first user of the system, means for identifying a set of users of a particular relationship to the first user within a particular proximity of the first user, and a message generator to prepare messages for the set of users in response to the message from the first user.

In another aspect, a method for managing interaction among users of a system is disclosed. The method may comprise receiving at a computer a plurality of join commands from a plurality of user at one or more locations, correlating users into sets according to general geographic location, correlating users into subsets according to indicia of commonality or affinity with each other, and instructing the users via electronic message to identified locations grouped by commonality or affinity. The method may further comprise instructing users in particular sub-sets with suggestions for activity based on the commonality or affinity. The method may also comprise instructing users in particular sub-sets with hints about their commonality or affinity. The method may also repeat the actions of correlating users into subsets according to commonality or affinity with each other, and instructing the users via electronic message to identified locations grouped by commonality or affinity, so as to form additional groups.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 10 is a screen shot of another test screen.
FIG. 13 is a screen shot of an invitation screen.
FIG. 15 is a screen shot of a community screen.

DETAILED DESCRIPTION

Figure 1:
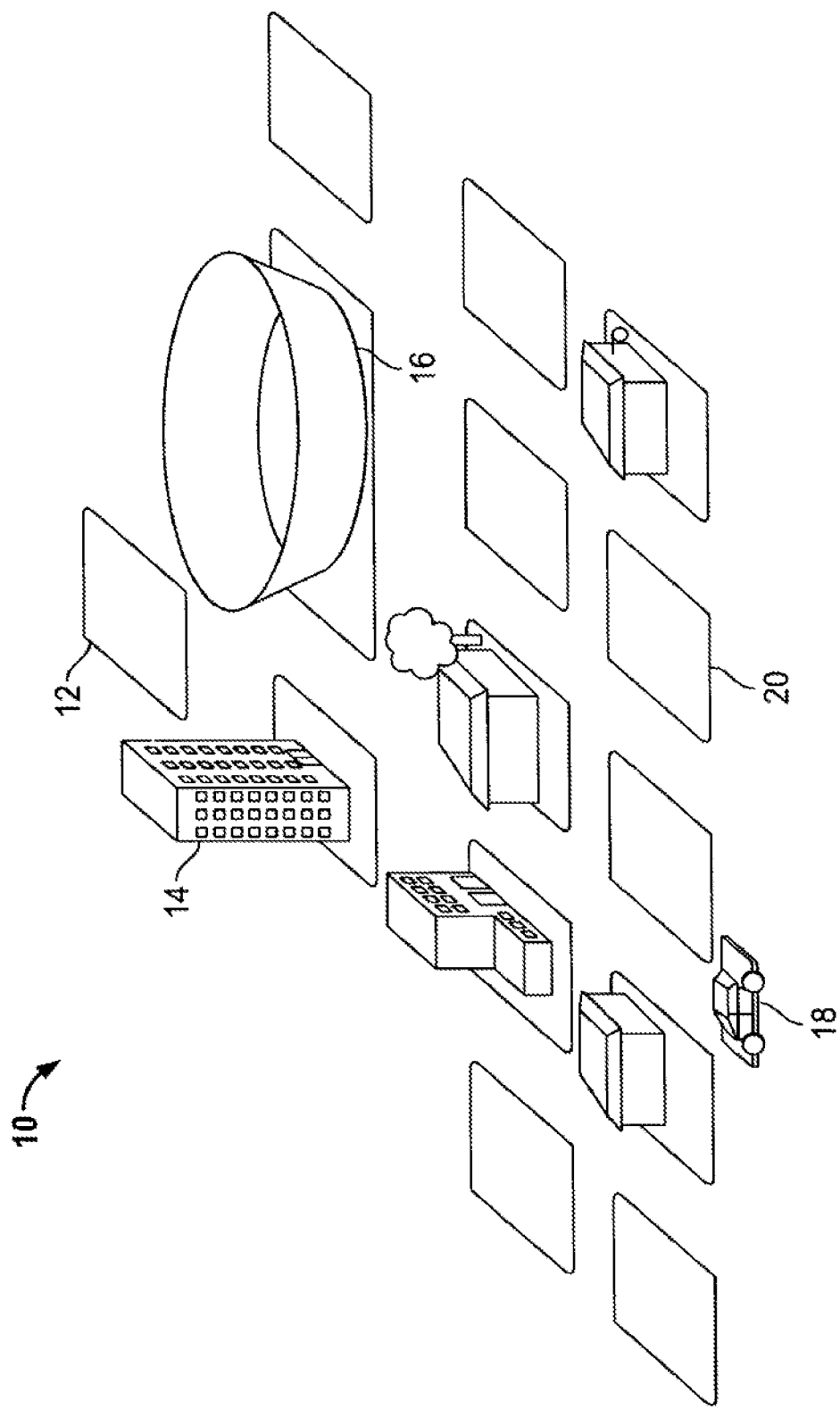
FIG. 1 is a perspective representation of a geographic area in which acquaintance may be located.

FIG. 1 is a perspective representation of a geographic area 10 in which acquaintances may be located. The geographic area 10 is hypothetical and is intended to exhibit a number of different venues in which acquaintances may find themselves. A venue may be any appropriate type of location in which a person may want to be, such as a home, apartment, bar, restaurant, parking lot, sports stadium or arena, or street address. The term acquaintance is used broadly here to indicate users who may want to communicate with each other. It may include old friends, friends of friends, or acquaintances of more remote relation.

In the geographic area 10, for example, a person could be located at an empty lot 12, 20, such as a parking lot or a park. In such a location, they may desire to meet with friends who want to grill out or play a game such as basketball or soccer in the park. Perhaps they have found themselves in the park alone or with an odd number of players, and would like to complete the teams for a fun game. A user could also be located in stadium 16, such as watching a college football game. Yet another user could be driving around in a car 18 or parked, while another could be home in her penthouse apartment 14, waiting for people to come to a party she is throwing. Each of these people could be friends, could be near each other, and could be interested in doing something together, and yet might not know that others are nearby and interested. What a waste.

Figure 2:
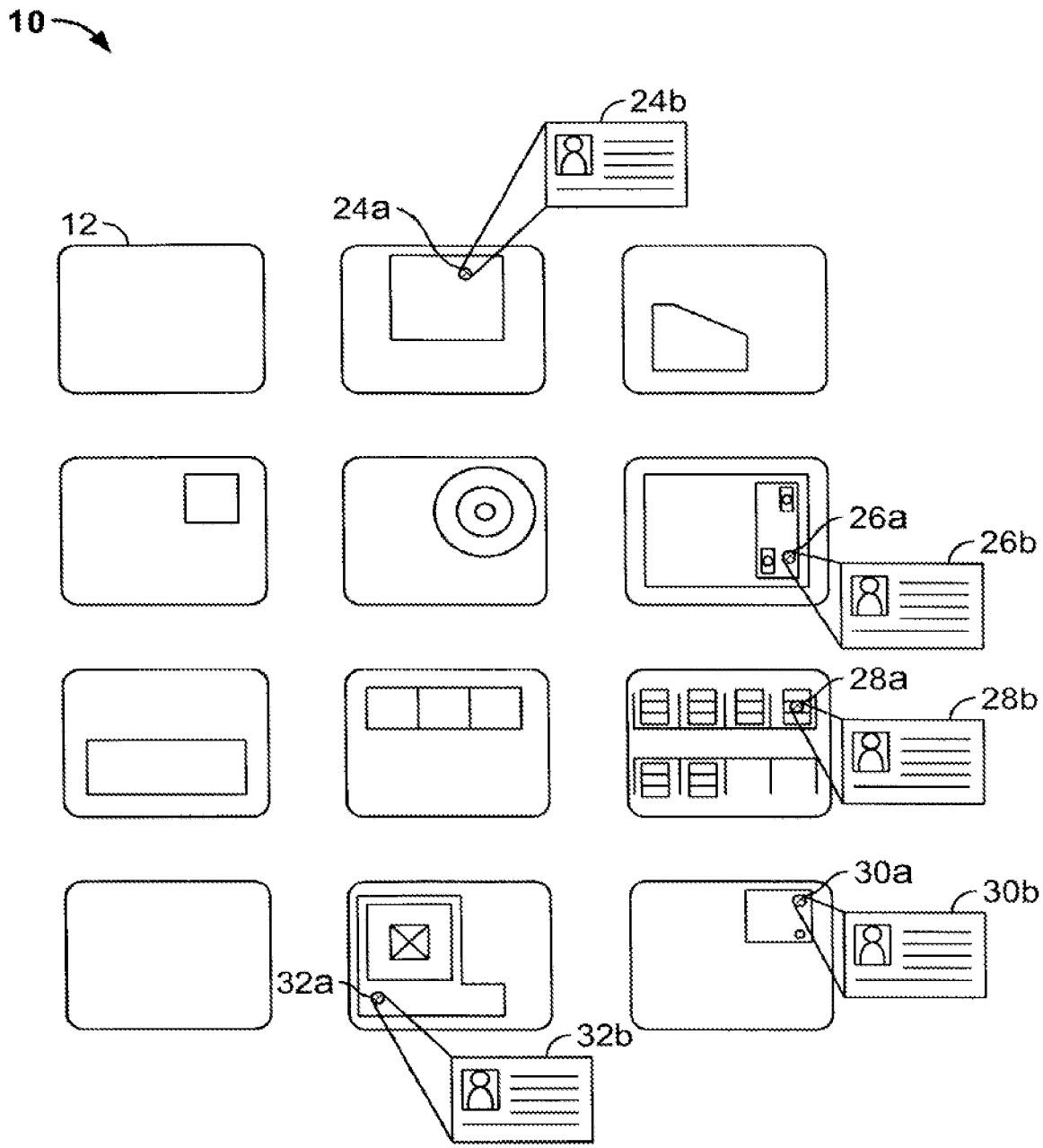
FIG. 2 is a plan view or map of a geographic area of twelve city blocks in which various acquaintance are located.

FIG. 2 is a plan view or map of an geographic area 10 of twelve city blocks in which various acquaintances are located. Some blocks such as block 12 may be open, such as for parking lots or parks, while others may have buildings located on them. Each location that may be uniquely identified may be considered to be a venue. As such, each user's location may be identified by the venue in which the user is located. For example, user 24*a* may be in a sports arena. User 26*a* may be at a bar, while user 28*a* may be sitting in a car in a parking lot. In such a situation, the venue may be identified by the name of the parking lot or its address, such as by cross streets. Finally, user 30*a* may be in a warehouse, such as at a rave party, while user 32*a* may be at home in their apartment. Each of these two locations or venues might simply be identified by their street address.

Each of the users is alone. Without assistance, they might each continue to be alone, without knowing that the others are within easy walking distance, and in some cases next door. If they had readily-available yet non-intrusive information about the location of one or more of the others, they might decide to go where the other person is and have a much better time. This increased social interaction can lead to many positive things that occur when there is more direct interaction with others.

Each of the users may be a member of or associated with a system (discussed, for example, below) that tracks the various relationships between and among the users, who form a community. Associated with the membership in that system, the user may provide information to complete a profile about the user. For example, profile 24*b* may contain all relevant information about user 24*a*, such as the user's name, gender, and other identification information. The profile 24*b* may also include one or more images or digitized photographs of the user. In addition, the profile may contain information about preferences by the user, such as smoking/non-smoking status, religion, educational background, hobbies, and other features that are commonly associated with profiles for relationship or dating systems. Moreover, bar or restaurant preferences may be stored in the profile, along with other appropriate information. Alternatively, information about a user or users may be stored in multiple files, including a file or files that would normally be termed a profile, and files that would not.

The profile could take many different forms. For example, classic profile information entered by a user, such as on a web page, (e.g., hobbies and various preferences), could be kept in one file or area. Other profile information could include restaurants reviews by the user. Still other profile information could include relationships identified by the user, including friend relationships and others.

Figure 3:
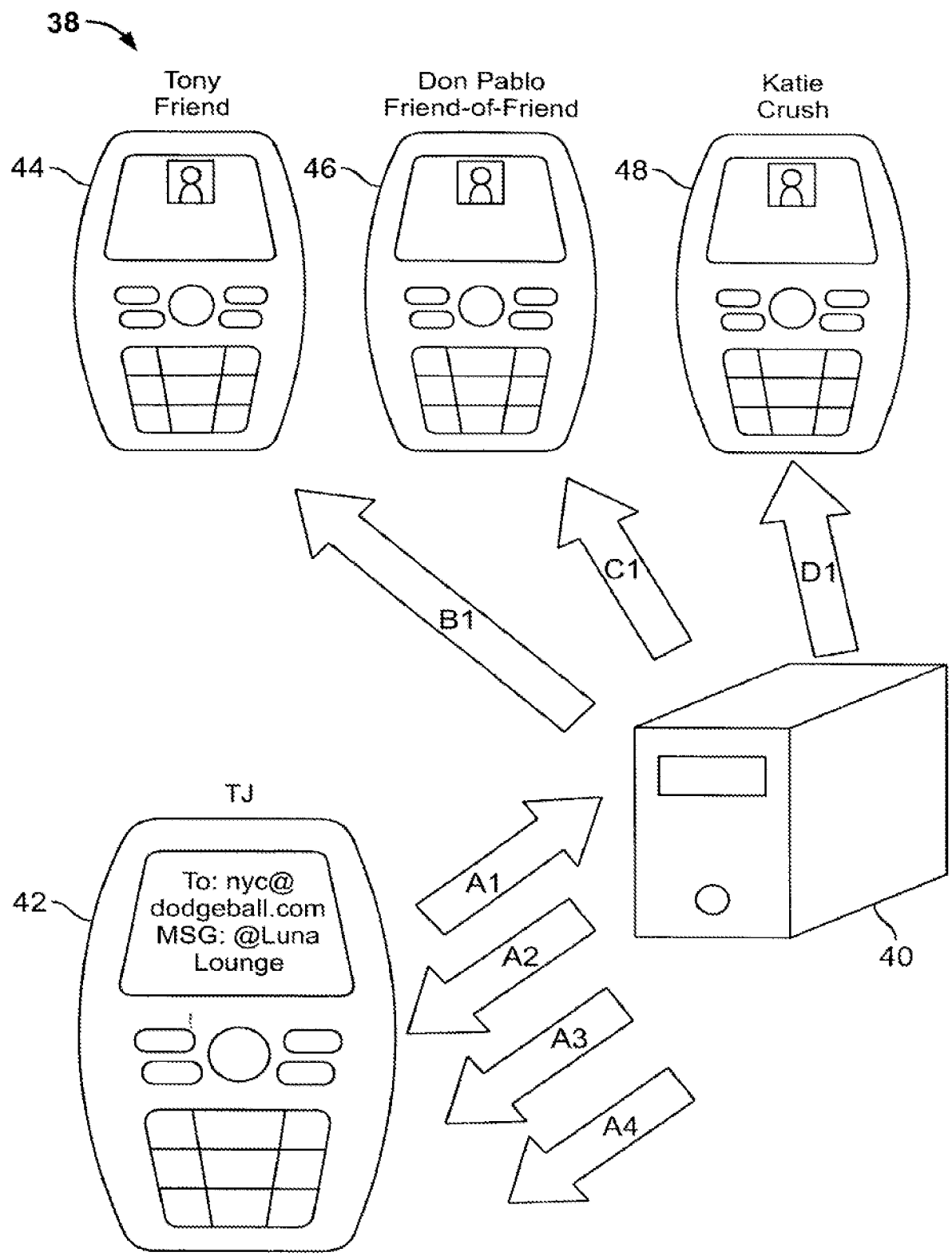
FIG. 3 is a schematic representation of information flow in a system for providing communication among acquaintances.

FIG. 3 is a schematic representation of information flow in a system 38 for providing communication among acquaintances. In this example, four users, as represented by their mobile devices, have previously established themselves as members of a community. Member TJ 42 is the protagonist in the example. However, information flow is bi-directional and constantly changing, so that no user is necessarily a primary user. Member Tony 44 has been identified as a friend of member TJ 42—such as by TJ selecting Tony from a roster of members of the system, and/or by Tony selecting TJ. Member Don Pablo 46 is a friend of member Tony 44, and thus by extension, a friend-of-a-friend of member TJ 42. Member Katie 48 is identified here as a "crush" of member TJ 42, which means that member TJ 42 has identified her as someone on which he has a crush. Member Katie 48 could also be a friend or a friend-of-a-friend of member TJ 42. Each of the members could have a variety of relationships to each other also (e.g., two users could be both friends and friends-of-friends), essentially filling out a social web or social fabric.

The labels applied for certain relationships—e.g., acquaintance, friend, friend-of-a-friend, and crush—are not intended to require any sort of societal relationship, but are meant to apply more broadly to the roles that users take or assign with the system. For example, member TJ 42 may choose to have a direct relationship with member Tony 44, and thereby make himself a friend of member Tony 44, even though the two might simply be called "colleagues" in a social setting.

In the example of FIG. 3, the operation being pictured is one in which member TJ 42 enters, opts in, or logs into the system, thereby starting a number of message flows. The other members have already identified themselves and their locations to the system, and are currently active in the system. The messages revolve around a server 40, to be described in more detail below. The server 40 could take any appropriate form, but in one example could simply be a server for receiving electronic mail messages from an electronic mail in box, analyzing the information in the messages, using that information to identify acquaintances who are currently logged onto the system 38, and generating appropriate messages to be transmitted to each of the acquaintances.

Member TJ 42 starts the messaging process by sending a message to the server 40. The message may take any appropriate form, such as a Short Message Service (SMS) message. The message may also be in the form of an e-mail message to be received by the in box of a related server. The message may be formatted in a particular manner so as to carry as much information in as little data space as possible. By using special formatting, the message can more easily operate using protocols such as SMS that have limited upstream bandwidth, and also to allow the user to more easily enter the data. In addition, use of a generic messaging format like SMS or e-mail allows the system to be carrier-independent so that users can gain the benefits of the system even if their carrier does not officially support it. In addition, the messages may be generated by an application, such as a J2ME/Java/Brew application, present on the device, so that users may be presented, for example, with menus and soft keys (which may be context dependent), and user selections may then be translated into commands to be sent by the device. Such commands may also be of a form so that they are carrier-independent. Commands may also be provided by voice, and could be handled similar to the well-known Moviefone system.

As described here, the message formatting comprises a message type indicator, or command, and a message body. The message type indicator may be a single character that represents the sort of functionality the user wants to invoke from the system. For example, a system could offer a number of functions based on the user's location, could answer questions for a user, and could deliver messages for the user. In such a context, a user could indicate that they are submitting a location by beginning the message with an "at" or "@" symbol. The person could indicate that they wish to post a question by preceding the message with a question mark, or "?". The person could indicate that they want to send a message, such as to an entire group of acquaintances, using an exclamation point, or "!," which in this context may be referred to as a "shout out" symbol.

Other symbols could also be used. For example, "1" or "w/" could be used to indicate the word "with" so as to tell the system the people (whether a member of the system or not) who are with you at a venue. Thus, for example, if the person with you is a member, the system could include information about them (such as their photo) in any messages sent to your friends. As another example, "off" may be used to stop receiving messages or to "opt out" of the system so that messages about you are not sent to other users. In addition, the command "help" may be used to retrieve assistance with command syntax. A command of "vacation" could also be used to opt out for a period of time, such as 3, 5, 7, 10, or 14 days. In addition, users may be allowed to set up specific groups, which may be subsets of their entire group of friends, or distinct groups of friends. For example, a user may have a work group of friends and a social group of friends, and may want to broadcast their activity on a particular night only to one group. A command in such an environment could take the form of "softball team@Luna Lounge." In addition, users could be presented with selections, or be allowed to enter commands, to block other users on-the-fly, e.g., "Reply with 'block' to stop receiving messages from this user." In general, however, there are great advantages from having a simple interface that is unobtrusive and easy for users to learn.

Messages may also be formatted or reformatted, for example, to lower the amount of information transmitted in the system. As one example, global find and replace may insert shorthand proxies in place of longer terms, such as "w/" for "with," "&" for "and," "st" for "street," etc. Content may also be added to a message, such as a message sent from a server to a device. For example, a request formatted as "?bar" in New York City might return dozens or hundreds of results. In such a situation, the device may be sent a follow-up question like "did you mean Ace Bar?" and perhaps also "or Luna Bar?" and perhaps also "or Magician Bar," until a full-sized message is created. As one example, a message may have a maximum allowable size of 140 characters. A user may also be able to make more complex queries such as compound queries. For example, a collaborative filtering engine may identify relevant information requested by a user, e.g., a user may ask for all venues within ten blocks that their friends have recommended or that people who have identified themselves with particular characteristics (e.g., lovers of Indian food) have recommended.

In FIG. 3, the screen for member TJ 42 shows that he is sending a message to a New York City instantiation of the system, and is telling the system that he is located at a bar called the Luna Lounge. When he executes a "send" command, the message is sent via path "A1" to server 40. As explained in more detail below, server 40 may then identify member TJ's 42 acquaintances, identify which of those acquaintances is currently active in the system, and also determine in appropriate circumstances which of the acquaintances is near the Luna Lounge. In this example, three acquaintances meet these criteria. The server 40 may send each of the acquaintances messages whose content depends on the type of acquaintance relationship. For example, member Tony 44 is a friend, so he may be sent a message, as shown by arrow B1, that states: "Your friend TJ is at Luna Lounge (171 Ludlow St.) Why not stop by and say hello?" Thus, the system will have taken the location identifier "Luna Lounge" and associated it with an address, such as through a simple look-up function, and generated a message in a predetermined format to send to member Tony 44.

Member Don Pablo 46, as one of Tony's friends, is a friend-of-a-friend to member TJ 42. Thus, the server 40 may generate a message, as shown by arrow C1, for member Don Pablo 46 such as: "TJ is at Luna Lounge. You know him through Tony." Member Katie 48 is a crush of TJ's, meaning that he has identified her as someone on which he has a crush, and as someone who he is willing to let know about the crush. TJ, in this example, is indeed a brave young man. The server 40 prepares and formats for member Katie 48 a message, as shown by arrow D1, of: "TJ has a crush on you. He is at Luna Lounge (171 Ludlow St.)."

Thus, with the help of some computer technology and a very brief text message (perhaps accompanied by a flattering photo), TJ is able to make his feelings available to Katie. Katie in turn has options. She can ignore the message and stay where she is (perhaps with another man). She can send a scout to the Luna Lounge to check TJ out. Or she can run over to the Luna Lounge herself, and determine the best way to approach TJ during that famously uncomfortable time of first meeting. Also, if both users have identified the other as a crush (a "bilateral crush"), the system may send a message such as "TJ has a crush on Katie. Katie has a crush on TJ. You two should make out. Reply to introduce yourself." Bottom line, the dating game has yet more rules, and more opportunities. As indicated next, the messaging between TJ and Katie (as managed by the server 40) is different than the messaging between TJ and others, so that Katie may maintain privacy and security.

While the server 40 is generating messages for all of TJ's acquaintances, it may also be generating messages for TJ—here one for each of his acquaintances. For example, with respect to Tony, the server 40 may transmit to TJ a message, as shown by arrow A2, that is the obverse of the message sent to Tony, i.e., "Tony is at Happy Place (2600 Forest Ave.) Why not stop by and say hello?" As to friend-of-a-friend Don Pablo, server 40 may generate a message, shown by arrow A3, such as: "Don Pablo is @ IC Muggs. You know him through Tony."

With the exception of the bilateral crush discussed above, the message regarding crush Katie is not symmetrical with the message sent to Katie, and thus offers privacy to Katie. Specifically, the message is nonspecific or anonymous about Katie's identify and location. The message, as indicated by arrow A4 may state: "One of your crushes is nearby. Make yourself look nice." The system may allow a user to identify a number of crushes, and thus TJ will not be able to know which is nearby. (The system may be set not to identify nearby crushes if the user has too few identified crushes.) Also, the message does not tell TJ where Katie is. Rather, in this embodiment, the message sent conveys: "One of your users (we're not going to tell you who) is somewhere within 10 blocks (we're not going to tell you where), but we just told them where you are, so go make yourself look nice." Where the area is sufficiently large (e.g., ten city blocks), the approach provides great anonymity.

It should also be noted that each user may be provided with other ways to limit their "transparency" to the system. As one main example, the system may be established so that users are only made part of the process above if they are currently "active" in the system. "Active" status can be established when a user sends a message, such as an "@" message, and may expire after a predetermined amount of time. Where the system is used for social applications, that amount of time may be, for example, about three hours. With such a time limit, a user is unlikely to be in a location more than three hours after arriving there, so such an approach helps ensure that the user is not visible in the system when they do not want to be, and also helps ensure that "stale" information is not on the system. In addition, when a user checks in again, even if it is before a prior check in has expired, the new location entered by the user overwrites the old location.

A user can also limit his or her visibility by not becoming active at all. The user could also simply leave the area, and the system and other users will not know where he or she went. In fact, the location identification described above may be inferential and based on self reporting by the users. In addition, users may send a command to opt out of the system and thus become inactive so that messages about them are no longer sent. Even where the location is determinant, e.g., based on GPS readings, the user may leave inactive a certain time after opting in, or may manually get out.

Users may also be given the option to limit how their information is shared or used. For example, a user may identify other users who they specifically do not want to associate with, and the system may block information flow between the users. The system might also require dual-affirmation for the closest relationships, such as a first-degree friend relationship. As such, each friend will need to identify the other before they can be classified as friends; unilateral identification of a friendship will only result in functionality like that described for a "crush" above. As always, the use of such features should be balanced with issues of usability and interference with the experience offered by the system.

The messages received and generated by server 40 may take a variety of formats, which can take advantage of the capabilities of the system 38 and of the users' particular devices. For example, because the system involves a sort of on-line community, thumbnail portraits of the community members may be available. As such, those portraits may be transmitted with any message about a user. In addition, though simple, single-line messages are described herein, more complex messages can be transmitted, such as multiple commands in a single line that the server 40 may parse out, or longer commands generated by a user's device in response to selections (such as selection of an icon) by a user.

Messages may also be accompanied by a number of response options. For example, each message may be formatted so that any reply to the message is actually sent to the user who is the topic of the message. In addition, a message may come with a number of preformatted responses, so that a user need not think up and type a reply, but can instead simply push a single button for a preformatted reply, which may be a reply back to the system or to another user who was the subject of a recently-received message. In addition, a user may be given the opportunity to one-button dial or voice message the other user. Moreover, activity with the system may trigger text of voice phone calls or pre-recorded voice messages or photos, etc. to be sent to users. Also, the system may use known methods to format graphical maps that show the location of a user relative to his or her friends, and may transmit such maps to a user.

Figure 4:
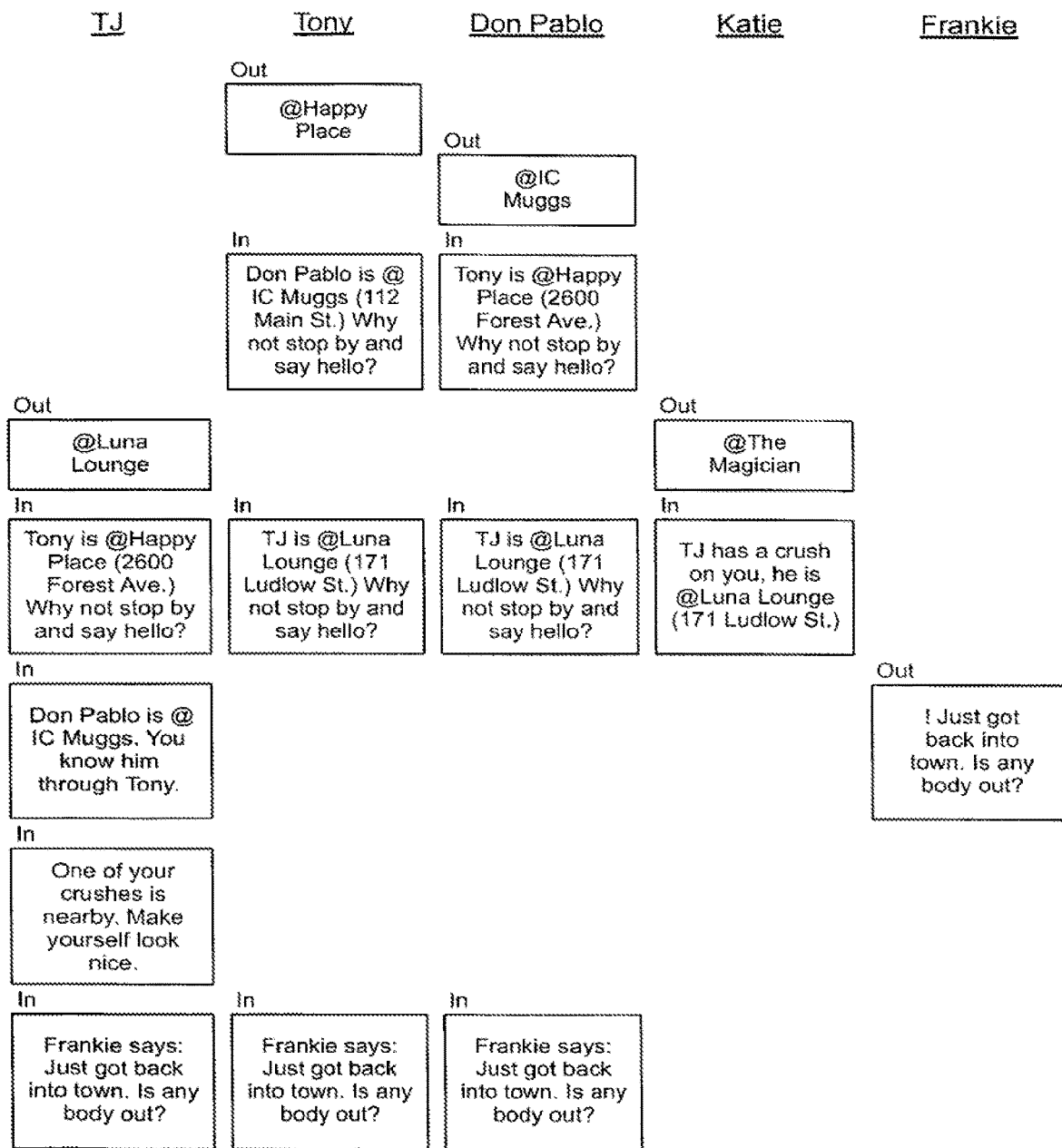
FIG. 4 shows messages sent and received by a number of acquaintances in a text-messaging system.

FIG. 4 shows messages sent and received by a number of acquaintances in a text-messaging system. In general, the figure shows outgoing (designated "out") and incoming (designated "in") for each of the members—TJ, Tony, Don Pablo, and Katie—in the example above. This representation is intended to show time-wise, approximately, how the messages flow in the example. The first messages are at the top of the figure, while the last are at the bottom. The figure also shows actions not discussed in the example above, including activation by Tony and Don Pablo before TJ's activation, activation by Katie at the same time as or after TJ's activation, and activation by another friend named Frankie.

Starting at the top, Tony and Don Pablo, who are friends, activate the service from respective bars where they are located, and the system tells each where the other is. At this point, Tony and Don Pablo could get together for a drink, either at Happy Place or IC Muggs. They may call or message each other to coordinate such a meeting. At some later time, TJ activates from the Luna Lounge, and the system generates appropriate messages, as discussed above, for TJ, Tony, and Don Pablo. Around the same time, but perhaps after, Katie activates. Katie is not a friend of any of the other members, but has been identified by TJ as a crush. Thus, both she and TJ receive messages as discussed above.

The added message is a "shout out" message from Frankie, who just got back into town, and wants to meet up with all his acquaintances, which include TJ, Tony, and Don Pablo (but not Katie). His shout-out message causes the message to be sent out to all of his acquaintances. They may then begin text messaging or calling between or among members of the group to determine where everyone can meet. For a shout-out, the initial messaging is one-way, from the shouter to everyone else.

Figure 5:
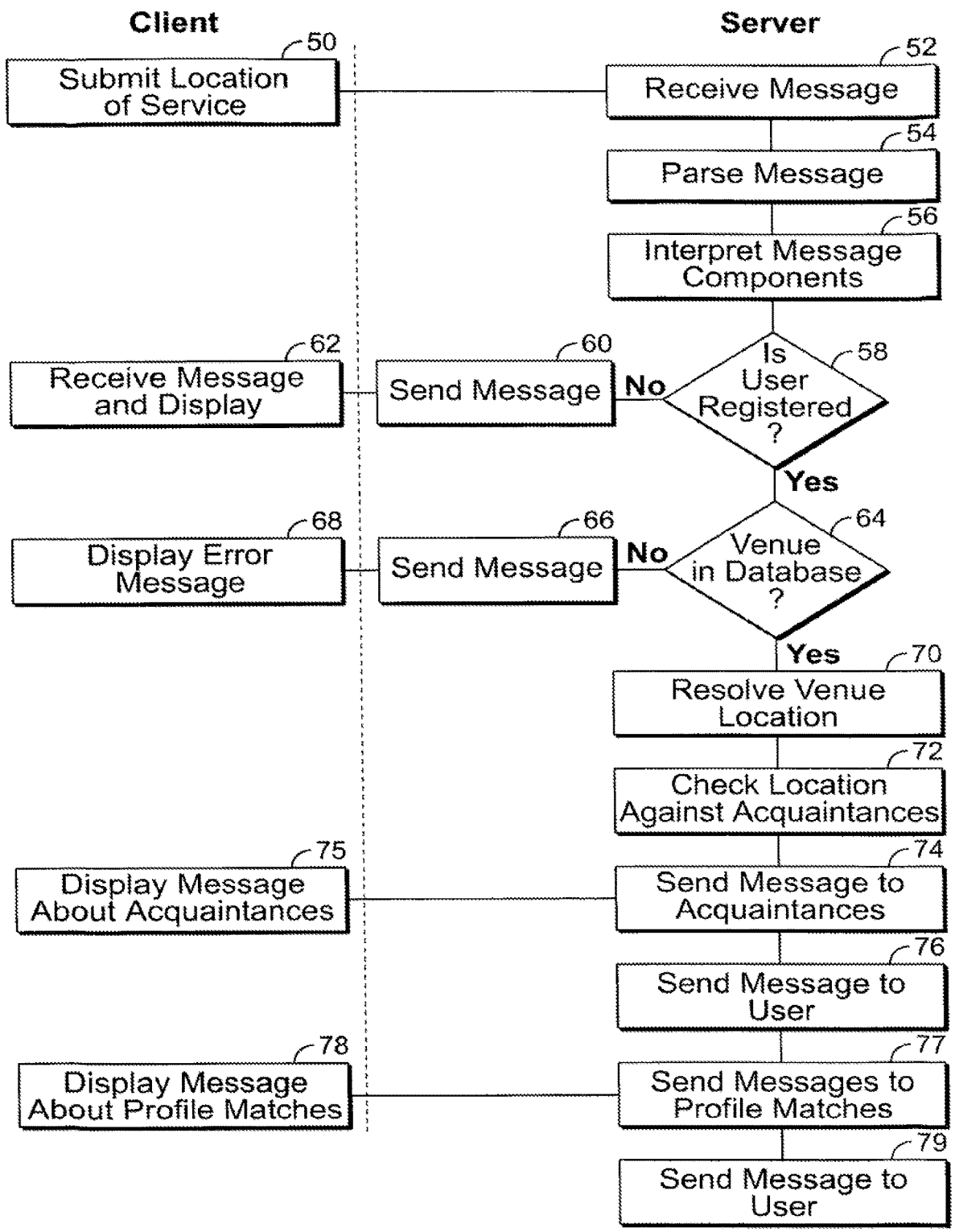
FIG. 5 is a flow chart showing actions by a client and a server in a system for allowing communication among acquaintances.

FIG. 5 is a flow chart showing actions by a client and a server in a system for allowing communication among acquaintances. The operations by the client and server are separated by a dotted line to help clarify the actions in the system. However, no particular technical arrangement is intended by showing the two sides. In particular, a formal "client-server" architecture is not needed. Rather, the labels of client and server are simply indicative of the device that is seeking information and the device that is providing information. Of course, the roles of client and server may be reversed as appropriate. In addition, the use of the singular form is not meant to be limiting; the client or server could be one device or a number of devices combined into a system or subsystem.

As shown in the figure, a client first submits 50 a device location, and the server receives that submission 52. The location may be submitted in a variety of forms. For example, the location might be submitted via a proxy, such as the "proper name" of a venue (e.g., restaurant, bar, public place, park, store, arena), or a street address. The location might be more determinant and explicit, such as location coordinates. Or the location could be automatically generated, such as by a GPS feature associated with the device. Users may also be provided opportunities to add venues to the database of venues, and may do so, for example, via a browser-presented mapping program in which the user may first locate local landmarks, and may then select a location to be associated with a venue name.

The message may also take many forms. One exemplary form is an SMS message. Another is a mobile e-mail message. In such a situation, the server may parse the message to extract usable information from it. For example, the message may have Multipurpose Internet Mail Extensions (MIME) that need to be extracted. In addition, the message itself may need to be parsed or otherwise analyzed. In one example, a system may parse the "to" information from the message to determine certain intentions by the user. For example, in the example above, the user sent the message to "nyc@dodgeball.com," thus indicating the user was in New York, and wanted to use functionality of the system dedicated to New York City—such as restaurants and bars in New York. Identification of such information can, for example, allow the system to distinguish a message "@Mortons" to be directed to a Morton's restaurant in New York City, Chicago, Dallas, or Minneapolis, depending on the prefix placed before the "@" symbol.

The system may extract out of the "from" field identification information about the user, so as to allow access to the user's profile. Such information is needed to determine, for example, who the user's friends and crushes are, and what their preferences are. Friends may be identified by a simple table look-up, while friends-of-friends can be identified with a database query. In addition, the message itself can be broken down, such as into a prefix or command portion, which could contain for example the symbols @, ?, !, or /, and a message portion, which could include a venue name or a question. Such interpretation of the message components is shown at box 56.

The system may then use the extracted information to perform functions for the device. For example, the system may initially verify the user by comparing the user identification information against a table of current members (step 58). If the user is not a member, the system may send a message 60 that the device may receive and display 62. The message could, for example, simply state an error based on the fact that the user is not a member. The message could also include an option for the user to become a member immediately.

Where the message is an "@" message, the system may check to see if the location information (such as a location proxy in the form of a venue name) is present in the system. This may involve, for example, comparing a received venue name against a list of venues for which the location is known (and may also check common misspellings of the venue name). If the venue is unknown, an error message may be sent by the server (box 66) and displayed by the client device (box 68). The server may also resolve the location 70, such as by retrieving geographic coordinates for a location from a look-up table having venue names and corresponding geographic coordinate locations, such as GPS coordinates. The distance between two locations may then be computed by known methods. Also, particular venues may have their separation distance determined beforehand, and such a distance may be used. Thus, location and distance may be determined both explicitly and implicitly, or by any appropriate approach.

The server may then test for all acquaintances of the client's user who are active in the system, retrieve their location coordinates, and check the first member's location against those other locations (box 72). Friends-of-friends and other similar relationships (e.g., users sharing certain common features in their profiles) can also be identified. The distance between users can be computed using well-known techniques, and high degrees of accuracy are not critical. Once a subset of members, which consists of (1) acquaintances, (2) who are active in the system, and (3) are nearby, are identified, the system may then format and transmit appropriate messages to each relevant member as described above (boxes 74, 75). The user of the client device may be sent one or more messages as discussed above (box 76).

The system may also provide for messaging between and among users who have not yet identified themselves as friends of each other, or who are not even acquaintances of each other. For example, the system may perform "matches" between or among two or more users with information in the user profiles. For example, users having a particular hobby that are active in the system and proximate to each other may be identified. In such a system, the server may generate, and each user's device may display, a message such as: "Ron Mexico is @Luna Lounge, and like you, he is an AC/DC fan. Reply to send a message to him" (boxes 77, 78, 79).

While the steps in the flow-chart are shown as occurring in a particular order for exemplary purposes, any useful order could be employed. Thus, for example, verifying a user could occur later in the process, or lack of verification could be inferred from an error created when an attempt to match the user to a database occurs. Also, additional steps may be added to the process or steps may be removed. For example, submissions by users may be checked for more than just location and acquaintances, or for factors other than location or acquaintances. Also, the order for receiving and sending messages, and the formats in which messages are received or sent may also be changed.

Figure 6:
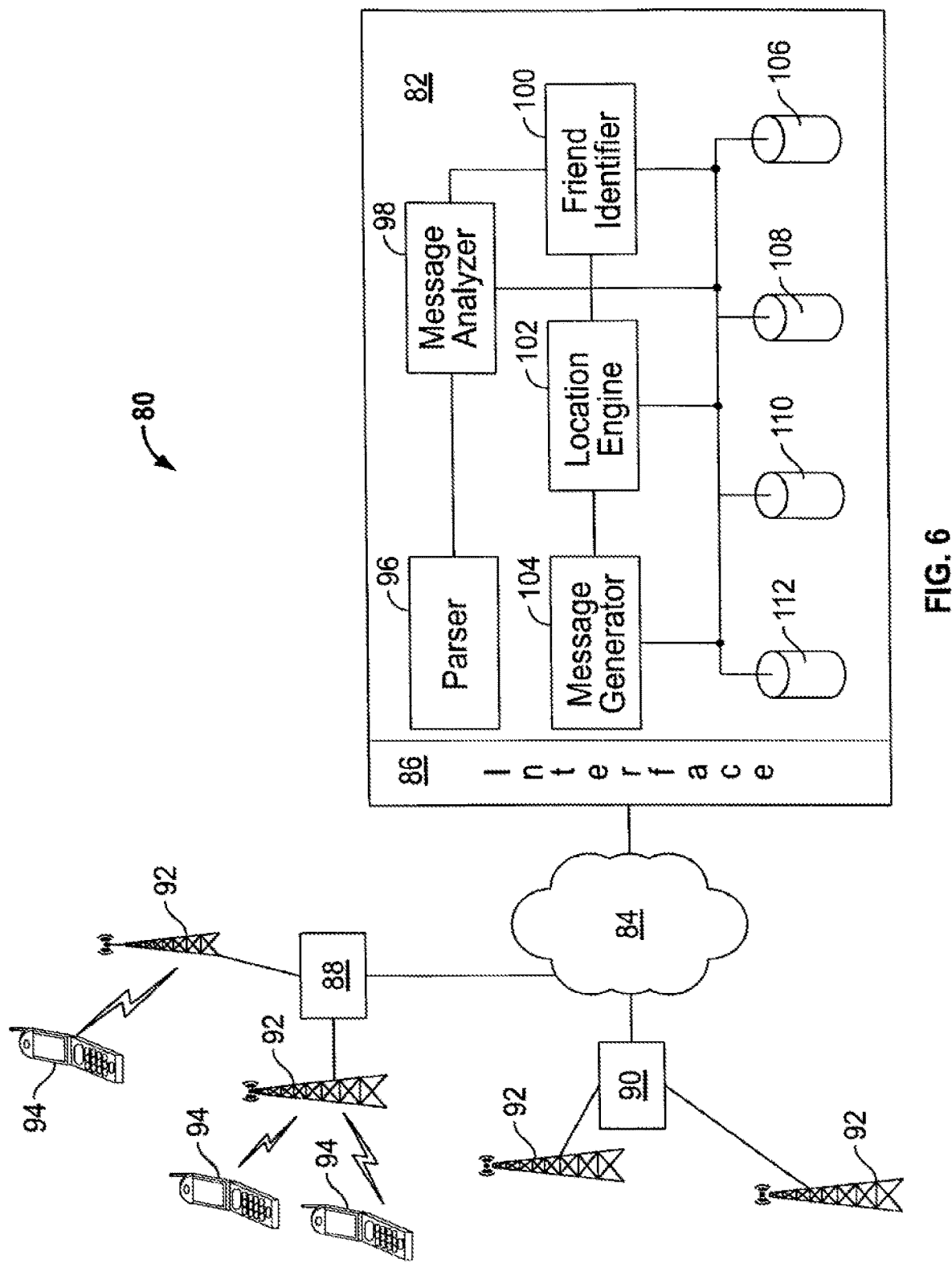
FIG. 6 is a schematic diagram of a system for managing communication among acquaintances.

FIG. 6 is a schematic diagram of a system 80 for managing communication among acquaintances. For illustrative purposes, the system is shown in a simplified, schematic form, but it could be, and would be expected to be, much more complex. However, the functionality of the system to be described can operate on a number of systems, as would be understood by a skilled artisan, and the particular implementation of the system is not critical.

As shown, system 80 comprises a sub-system, which itself may be a computer system 82 such as a computer server or group of servers. Computer system 82 functions to communicate with the outside world, such as through a connection to a public network like the Internet 84. System 82 may also be connected to or through other networks, such as a local area network (LAN). Such a second connection may permit for monitoring, maintenance, and updating of the computer system 82 by an administrator. The Internet 84, as anyone knows, can be further connected for communication to any of a variety of other systems and sub-systems. As shown in this example, the systems include cellular networks 88, 90 that may communicate with mobile devices 94 through antennae on towers 92. Communications between and among these systems may follow standard protocols and guidelines, such as for SMS or MMS text messaging, e-mail, WAP operation, TCP/IP, or UDP, including with applications programmed (e.g., j2ME) to provide alerts while listening for incoming data.

The computer system 82 includes a number of components that allow it to communicate and to have functionality like that described above. For example, interface 86 may handle communication with the world outside computer system 82. The interface 86 may comprise, for example, a web server and/or a mail server. In one embodiment that allows for simplified operation, messages from users can arrive in a common e-mail in box, and be handled in order to extract information from the messages. Messages may also be received as SMS or MMS text messaging. Interface 86 may also comprise other servers or combinations of components.

Arriving information, such as in the form of messages, may be first handled by parser 96, which may be programmed in a conventional manner to recognize certain information in a message, extract it from the message, and place it into a form that is usable by the computer system 82. In a typical text message, the information may be in MIME headers such as To, From, Subject, and Body. The format of incoming messages may vary from carrier to carrier or may vary for other reasons (e.g., e-mail versus SMS), so particular parsing routines may be used to match the identified carrier for the incoming message.

With the information extracted from the message that enveloped the information, a message analyzer 98 may look at each piece of information, as described above, to determine: (a) what city the user is in; (b) who sent the message; and (c) what the user is trying to do by sending the message. For example, the system may first look at the "to" field to determine which program or system to use, by assuming, for example, if a user sends a message to "nyc@dodgeball.com," then the user is in New York City. The system will thus infer that the user is in New York City, and will deliver content and answers that are relevant to New York City.

The system may then look to the "From" field to determine who sent the message. For example, the message may be "from" 9175551212@vext.com, which could be a reformatted address for a text messaging cellular telephone. The message analyzer 98 may initially split the data at the "@" sign, using the data to the left to determine who the user is and using the data to the right side to determine if the message is coming from a mobile device at all. The data to the right of the "@" sign may be compared to a database table of all the accepted e-mail hosts so that, for example, users who are not sending from a mobile device are told "your device is not currently supported."

The data to the left of the "@" sign may be compared to a database table of user identification numbers, such as telephone numbers. The identification data may then be used, e.g., by friend identifier 100 to look up all friends, and friends-of-friends for the user, and then to determine which of those users is currently active in the system (e.g., logged-in in the last three hours).

The locations of the active users identified by the friend identifier 100 may be computed by location engine 102, and the distance between respective users may be computed by known methods to identify which users are proximate to each other (e.g., within ten blocks of each other). Various parameters may be used by location engine 102, such as parameters that set the distance between users that controls whether the users receive messages about each other. For example, the distance may be a predetermined distance (e.g., ten blocks) or may vary based on location (e.g., closer for areas, like a downtown, where people can expect to walk from venue to venue), time of year, weather (e.g., closer when it is cold or raining outside), or other appropriate factors.

The system may be modular to allow for multiple applications running on a common platform. The platform may include, for example, the interface 86, parser 96, message analyzer 98, and location engine 102. The platform may thus be established to verify users, establish their locations, and communicate with them. Various applications may then use that information to provide certain social functionality, such as that described herein with respect, e.g., to FIGS. 5 and 16.

Standard programming interfaces may also be defined for the platform to make development of applications easier. Such a system may allow for ready development of new applications that can be readily incorporated into a common system with which users are already familiar.

The parser 96 or message analyzer 98 may also extract the "subject" and "body" fields for the command that the user has sent. As noted above, the command can be comprised of, for example, an ascii character such as !, ?, or @ as a short-hand indication of the user's intent. The character may be followed by one or more commands or parameters.

One command is the "at" or "@" command, which allows a user to identify his or her location, such as in a particular venue or at a particular address. Exemplary uses of this command are described above and below. As noted, this command notifies certain other users of the requesting user's location, and also identifies the person as "checked in" or active in the system (so that the user will receive messages from other users, at least for a period of time).

Another command is the "shout out," or "!" command, which as described above, causes a message to be sent to all of the users in a particular group, such as a group consisting of the friends of the person requesting the shout out. The shout-out command may also allow a user to broadcast a message to all other users in a particular proximity (whether geographic and/or time frame), regardless of their acquaintance relationship. The syntax of this latter option involves preceding the "!" command with a location identifier, such as "Ace Bar!hello there," so that everyone recently activating near Ace Bar receives the message "[User] is @ Ace Bar and says 'hello there' @ 11:59 p.m." If the user instead says "!party at my apt tonight", without specifying a venue before the command, the message will be broadcast to all friends of the user, but not friends-of-friends (though in other examples, it could also be configured to be sent to friends-of-friends, or even more distance acquaintances). The message could be, for example, "[User] says: 'party at my apartment tonight' (11:59p.m.)" Other formats for messages may be employed, as would be understood by a skilled artisan.

A third command is the "listen," or "." command, which allows a user to opt-in with their location but without broadcasting their whereabouts to their friends. For example, the user may enter ".Luna Lounge". In such a situation, the user will be added to the database of active users, but no messages will be sent out about the user's location. Thus, for example, if a friend or friend-of-a-friend opts-in or activates within the appropriate distance of the user, the user will receive a message, but the friend or friend-of-friend will not. The system may also be configured to allow other users to request "listen blocking" so that their location is not transmitted to any user requesting listen mode.

A fourth command is the query or "?" command. This command may be part of a request such as "Ace bar?", which will look up the query in a database related to potential queries, and will return information corresponding to the query. In the example, the system may return the venue name, address, and cross street, such as in a message like: "Ace Bar is at 531 5$^{th}$ Street (btw Ave A & B) 555.867.5309. Reply with @venue name to check it out!" Users can also search for nearby "attributes" by sending the name of the venue they are near, as well as what they are looking for. For example, sending "Ace bar?pool table" will return a list of all locations closest to the geographic coordinates of the Ace Bar that have either (a) a "pool table" attribute in the database, or (b) a user-submitted comment that contains the word "pool table" or a near synonym. The returned message may take the form of "We found 3 matches for 'pool table' near Ace Bar: Black Star, Max Fish, Whiskey Ward." Each of the identified locations may be marked, such as by a hyperlink, so that the user may easily seek more information about the location. In addition, the system may follow up by providing a small map showing the location of the user and the location of a selected venue. Such functionality may be implemented with known techniques. In these scenarios, the user's location is not made available and messages are not sent to other users. However, if the user selects one of the venues, any later commands that involve communication could be provided with the location as a default. For example, if the person selects "Black Star" above for more information, the next time the user presses "@", the system may automatically fill in "Black Star," assuming that the person ended up going to Black Star.

In addition, a user may establish permanent queries that are run whenever a user activates, or that are run constantly or near-constantly (e.g., when the user's device is GPS-enabled). For example a user may establish a permanent query for Starbuck's stores and be told whenever he or she is are near such a store.

Other commands may also be used with the system, and may include combinations that use the commands above. For example, a user who wants to join a system-directed social session (described below) may enter "join@Luna Lounge" to show that they want to join, and that they are presently at the Luna Lounge. This command tells the system the function they would like, and also passes a parameter to the system that allows the system to place them in a social session. The computer system 82 may also be provided with a number of appropriate databases. For example, acquaintance database 106 may provide tables to show the friends of each particular user. This database 106 may then be queried to identify other relationships between and among users. User profiles database 108 may store data regarding profiles for each user in the system and may also store information about venues, such as venue reviews. Location databases 110 may correlate information about venues, such as venue names, with geographic coordinates for each location. Finally, administrative database 112 stores information needed to make the system 80 operate properly, such as workflow logic and rules for events that are managed by computer system 82. The pictured databases are exemplary only. Other databases could be employed, and the databases may be arranged in any appropriate manner.

Figure 7:
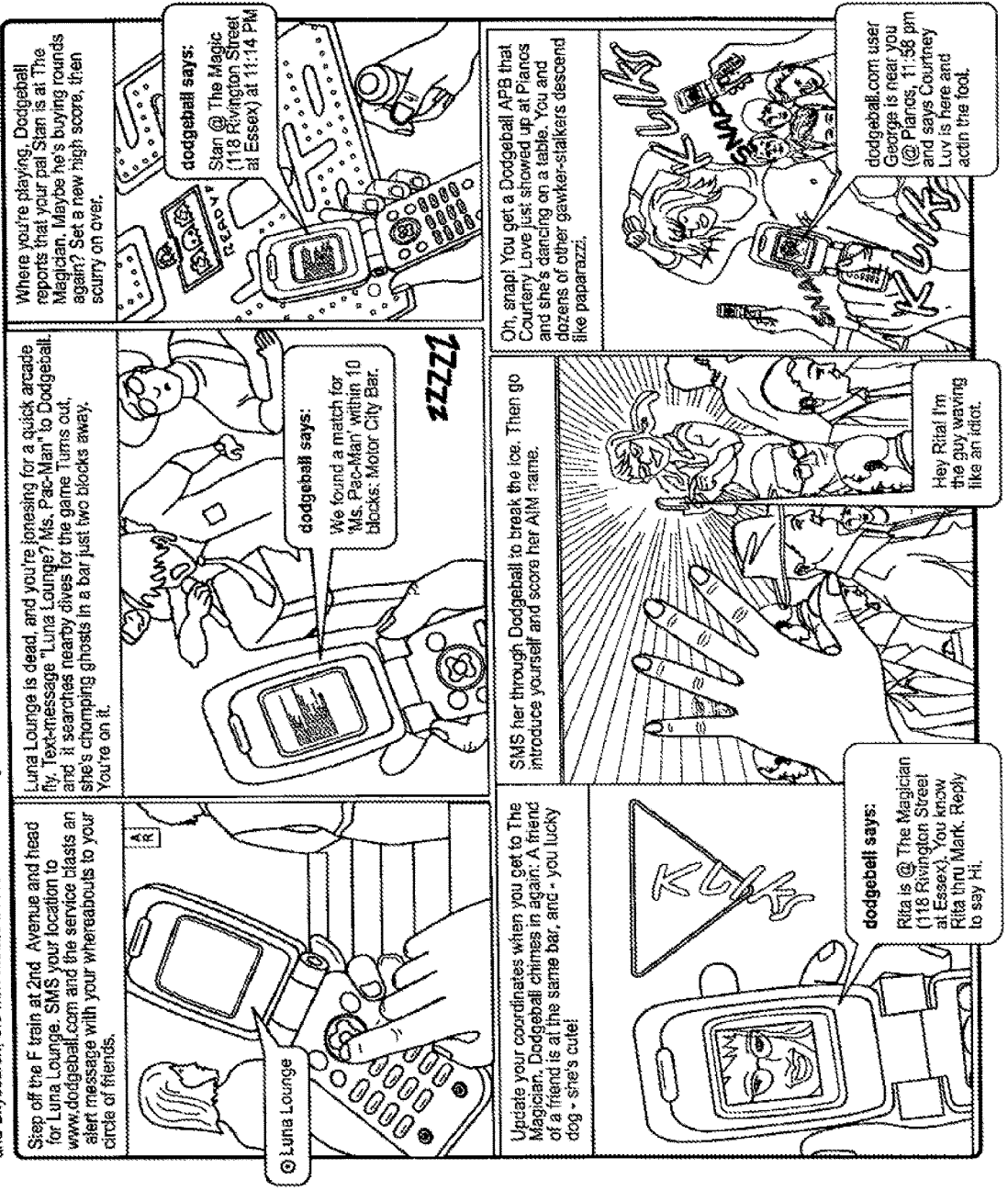
FIG. 7 is a cartoon showing exemplary uses of a system for enabling communication between and among acquaintances.

FIG. 7 is a cartoon showing exemplary uses of a system for enabling communication between and among acquaintances. This cartoon was published in the June 2004 issue of Wired Magazine, and shows exemplary applications of the service known commercially as Dodgeball. In the first frame, a user enters an "@" command as described above. The user reaches the first venue in the second frame; it is a dead venue and the user is jonesing for some Ms. Pac-Man, so the user enters "Luna Lounge?Ms. Pac-Man." The system responds with nearby venues that are associated with Ms. Pac-Man (such as through a review that another member completed for a venue). While playing Ms. Pac-Man in the third frame, the user learns that another friend is at a nearby venue, and after going there (frame 4), learns that a cute friend-of-a-friend is at the same place. The user and the friend-of-a-friend (who received a message about the user) can then break the ice by messaging, and may then talk to each other. In the final frame, one of the user's other friends, having spied Courtney Love dancing on a table (this is a fictional story), has sent out a "shout out" message telling all their friends to converge on the area. Thus, in particular implementations, the features described herein can provide new and rewarding social interaction that can be enlightening, entertaining, and educational.

Figure 8:
FIG. 8 is a screen shot of a sign-up screen.

FIG. 8 is a screen shot of a sign-up screen for a social software web site. Such a site may be employed by a system to allow users to readily enter and track information about themselves and their acquaintances. That information may then be used with a messaging system like that described herein. Generally, users register and manage their settings and relationships via a web site. The web site serves as a front end for a database (which may comprise one of more distinct databases or database components such as tables) that defines users' attributes and the relationships between and among users. In this way, the web site and database can be similar to those provided by other various "relationship" applications such as Friendster, Orkut, Tribe, and LinkedIn. The core links are between friends (or direct acquaintances). Database queries may determine friend-of-friend relationships. The web site may give users the ability to invite new friends to join the site or community, and may approve and/or deny relationship connections.

In one feature, the web site allows a user to select a friend. Such a selection may be made of someone who is not yet a member (e.g., by having the system send them an e-mail invitation to join the community, as a friend of the user) or of someone who is a member (e.g., in a "friend request"). In one implementation, the two may not be connected as "friends" until both have approved of the relationship. When they are made friends, there may be two database entries: one connecting User A to User B, and another connecting User B to User A. The system may also allow a user to identify other users who should not receive information about their location (i.e., to "block" another user's reception). In one embodiment, this is accomplished by allowing the user to break one end of a connection without breaking the connection, and without letting the other person know the break has occurred. To do so, the system adds an additional field to the database that allows a user to block one side of a relationship without destroying or deleting the connection in the database, so that when a user opts in, checks in, or activates, they are not broadcasting to their raw friends list, but instead are broadcasting their location to everyone except those individuals who they have chosen to block.

In another feature, users may identify members of the community on whom they have a crush. For example, the web site may display normal profiles or "ambient profiles" of various other users, which may include pictures of the users—much the way dating web sites contain profiles of users. The normal profiles may contain information that the user has entered, such as age, religion, sexual preference, gender, political persuasion, drinking/smoking/drug habits, hobbies, favorite movies/plays/songs, etc. The ambient profile may be built, not from information consciously entered into the profile by the user, but by observations of contributions the user makes to the community over time. For example, the system may make note of locations at which the user has recently checked in, what venues the user has commented on or written reviews about, and which friends (or friends-of-friends) the user has recently been associated with. Thus, a user's ambient profile changes constantly over time because they are interacting dynamically with the community.

A user may create a "crush list" of, for example, up to five other members, with whom the user is willing to make known their feelings. For example, the user may be physically attracted to another user's photo, or may like certain selections (such as hobbies) in the other user's publicly available profile. Users may add to or edit their crush lists at any time. Users may also choose to be made invisible to any crushes also, for example, if they are constantly being annoyed by messages about crushes. A separate database table may be used to track who has a crush on whom, and to deliver this information in real-time to users. For users who do not want to be part of the crush scene, the database table may simply contain a blocking "flag" for a particular user. That flag can be checked by the system before any crush messages are passed relating to such a user.

As shown in FIG. 8, a user can enter standard profile information such as name, e-mail address, gender, user name, password, and telecommunications information. Some of this information may be made available to other users, while some (e.g., password and e-mail address) may be kept private. Additional information may also be gathered, such as by using a continued form similar to that shown in FIG. 8, by question and answer, or by other appropriate method. For example, various sorts of personality tests (e.g., Myers-Briggs) may be provided to help learn more about the user's preferences. In addition, profile information may be imported from other applications.

Figure 9:
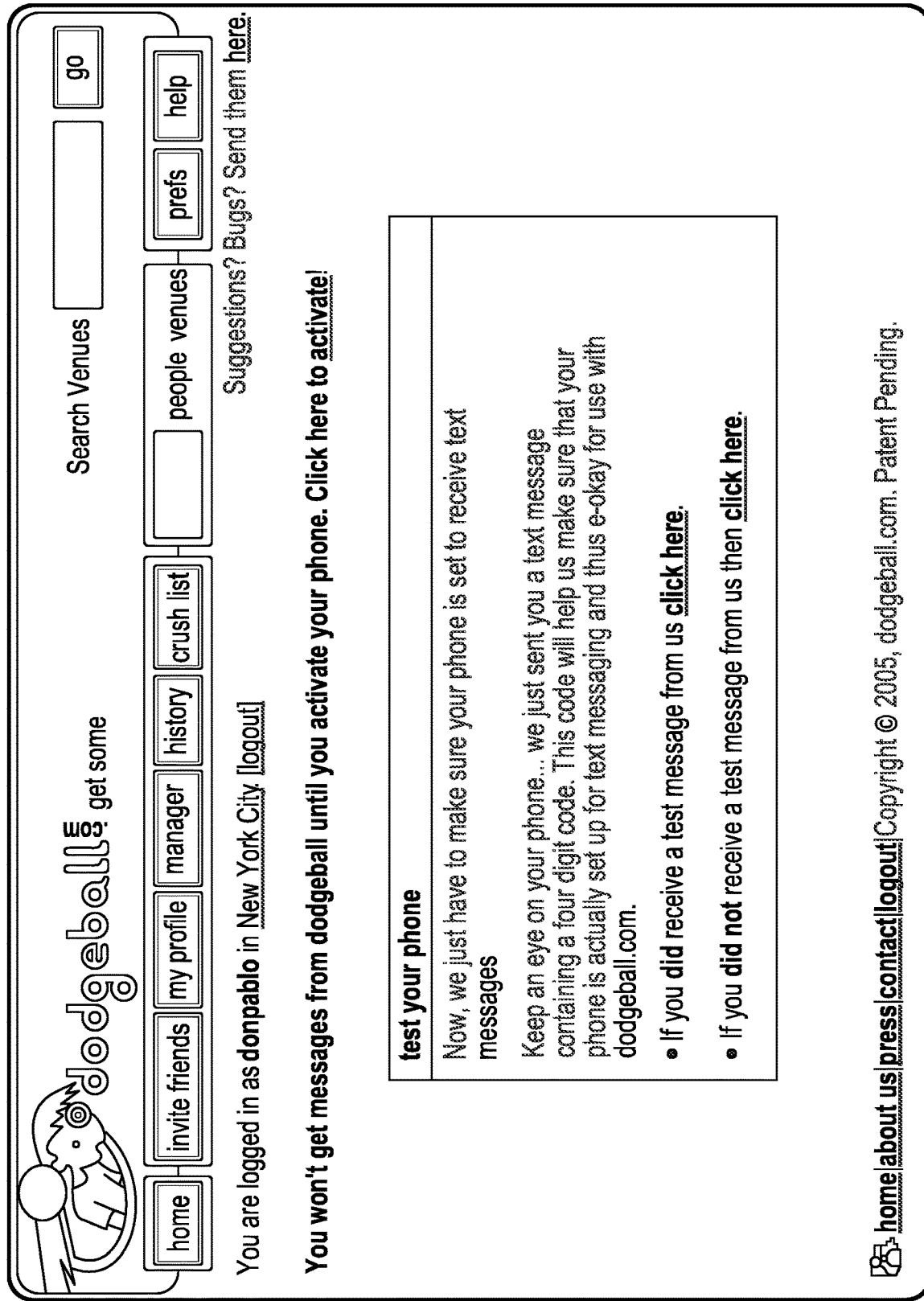
FIG. 9 is a screen shot of a test screen.

FIG. 9 is a screen shot of a test screen. This screen may be shown to a user when they are setting up an account in the community or at other appropriate times. As shown, the system sends a test text message to a mobile device, and allows the user to click on an appropriate choice in the web browser to indicate whether the test message was properly received. In general, the user will not receive a message if their device does not have text messaging capabilities.

FIG. 10 is a screen shot of another test screen. This screen is shown if the user provides a negative answer to the question on the screen of FIG. 9. The screen provides links to help screens, and also notifies a user that they can still send some messages to other users even if they cannot receive messages.

Figure 11:
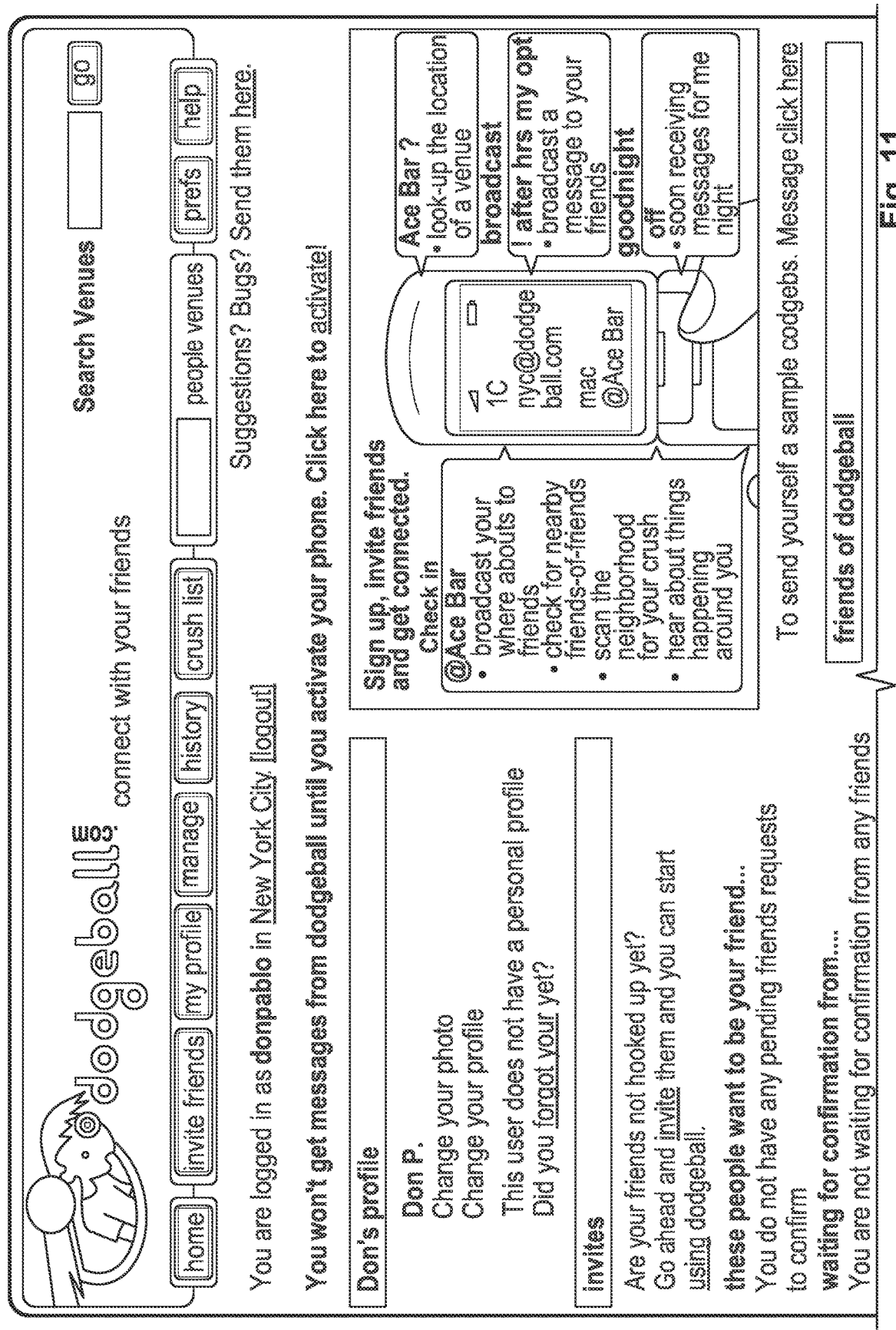
FIG. 11 is a screen shot of a profile screen.
Figure 12:
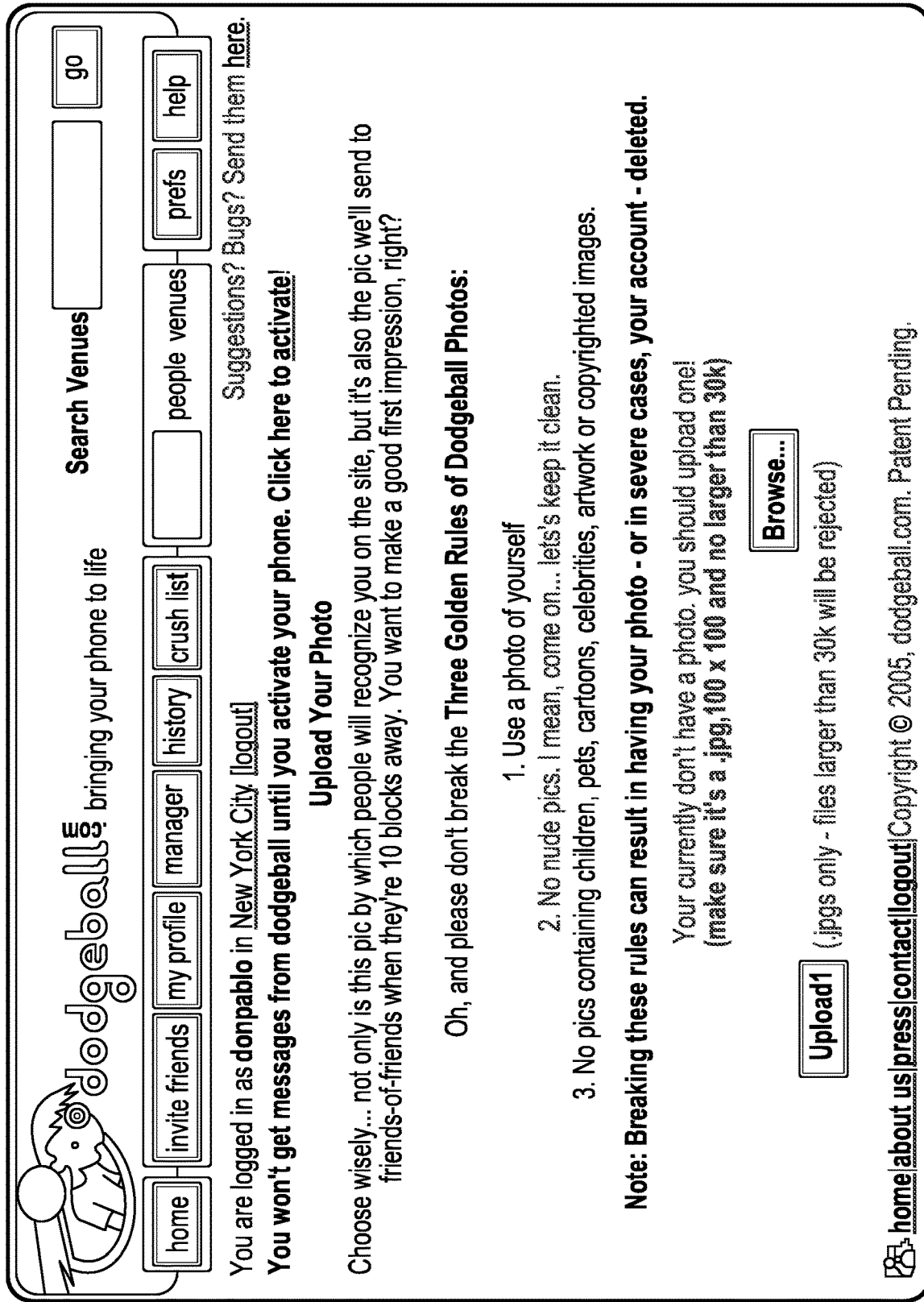
FIG. 12 is a screen shot of a photo update screen.

FIG. 11 is a screen shot of a profile screen. In general, various profile screens may be provided, each of which will display information relevant to its intended audience. For example, a public profile screen might show the person's photo, hobbies, screen name, and other interests (such as those that would be available at any social or dating site). A restricted public profile might show additional details, but be available only to users who have already been identified as friends. A private profile screen may contain even more information, such as passwords, history (e.g., recently-visited venues), and extra profiling details that should not be available to other users. In the private profile screen shown in FIG. 11, the user is also provided with actions they can take, such as changing their photo, inviting new friends, and identifying current members as friends. The screen may also provide simplified instructions for the system FIG. 12 is a screen shot of a photo update screen. This screen provides a simple interface that allows a user to browse for their photo on their computer and then to select it to be displayed by the system. The screen may also provide instructions for uploading a photo.

Figure 13:
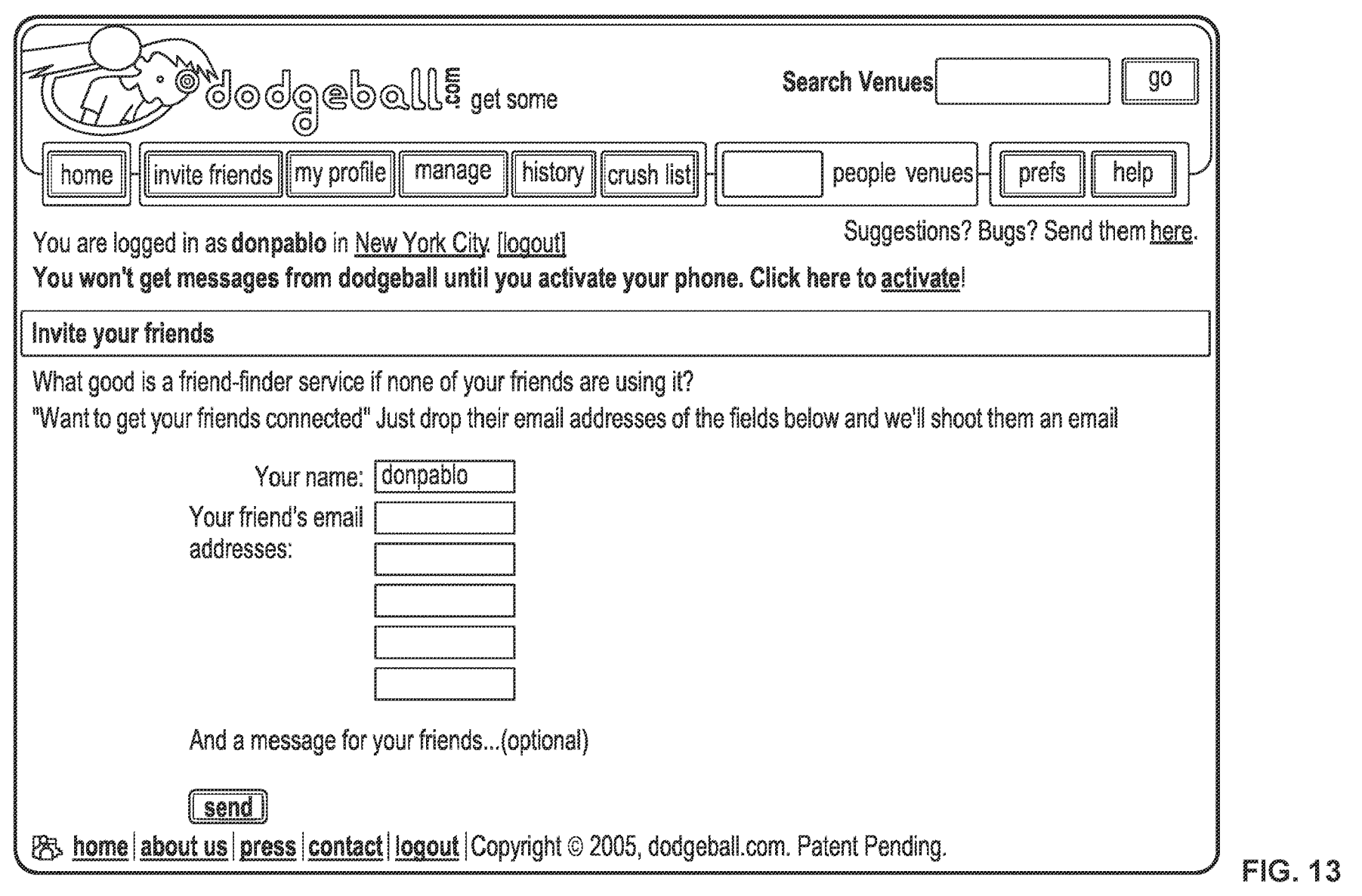

FIG. 13 is a screen shot of an invitation screen. This screen allows a user to enter a single message to be sent to their friends, including friends who are not members of the system, and also to include the e-mail addresses of multiple people. In using the term "friends" here, the reference is to real-world friends, and not simply to people who are a first-degree acquaintance of the user, or that are even users of the system at all. The system may append additional information to the message, such as a hyperlink to a screen that allows friends to sign up with the system.

Figure 14:
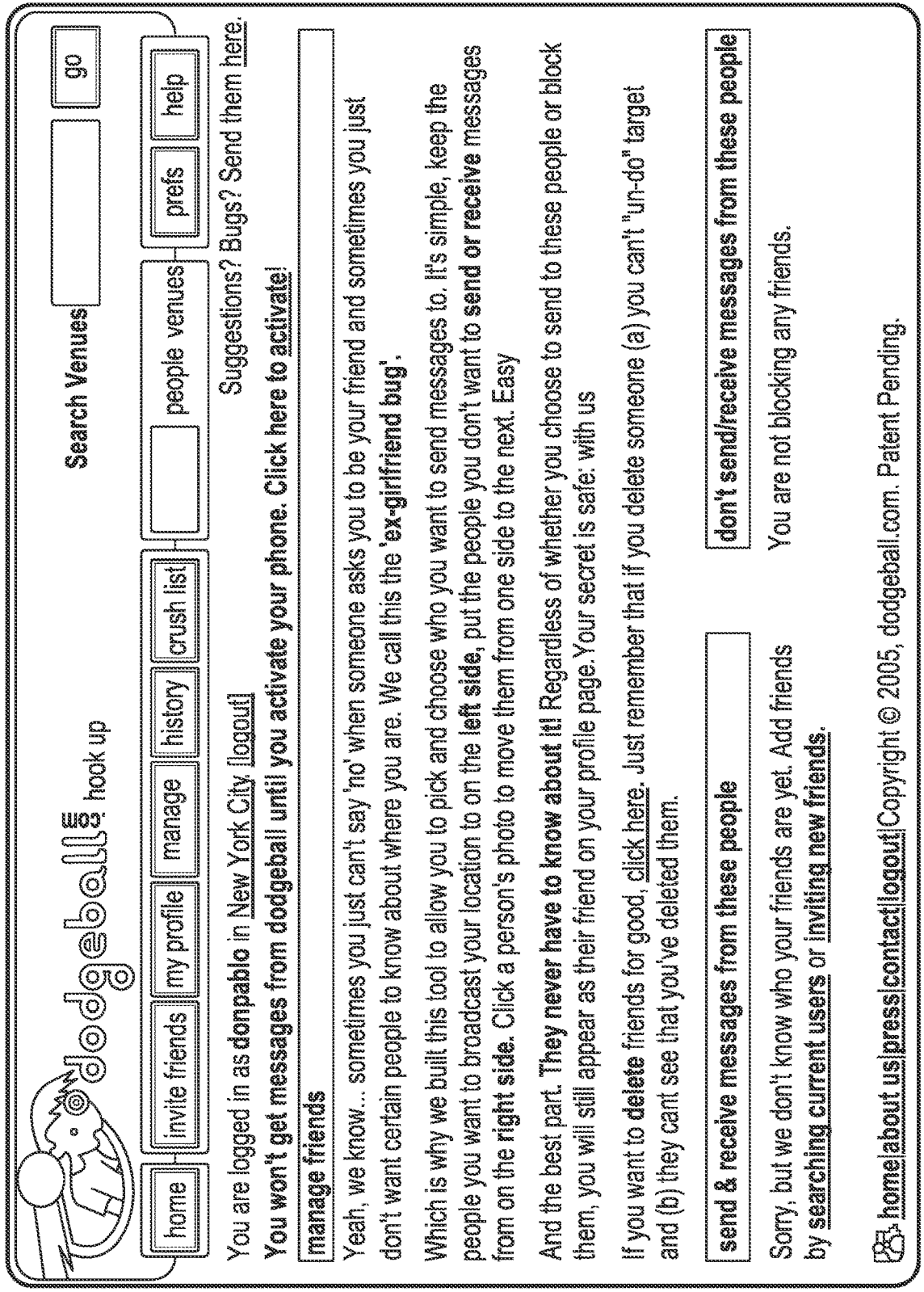
FIG. 14 is a screen shot of a friend management screen.

FIG. 14 is a screen shot of a friend management screen. This screen provides a simplified format by which to identify certain people as full friends who will receive all information about the user and his or her location, and other people as partial friends who will not receive messages and from whom the user will not receive messages. In addition, other screens may be provided wherein a user can enter information about a friend (such as first and last name) to get information on the friend if he or she is a member of the community, or to enter the name of a venue to get information on the venue (such as reviews from other users).

Figure 15:
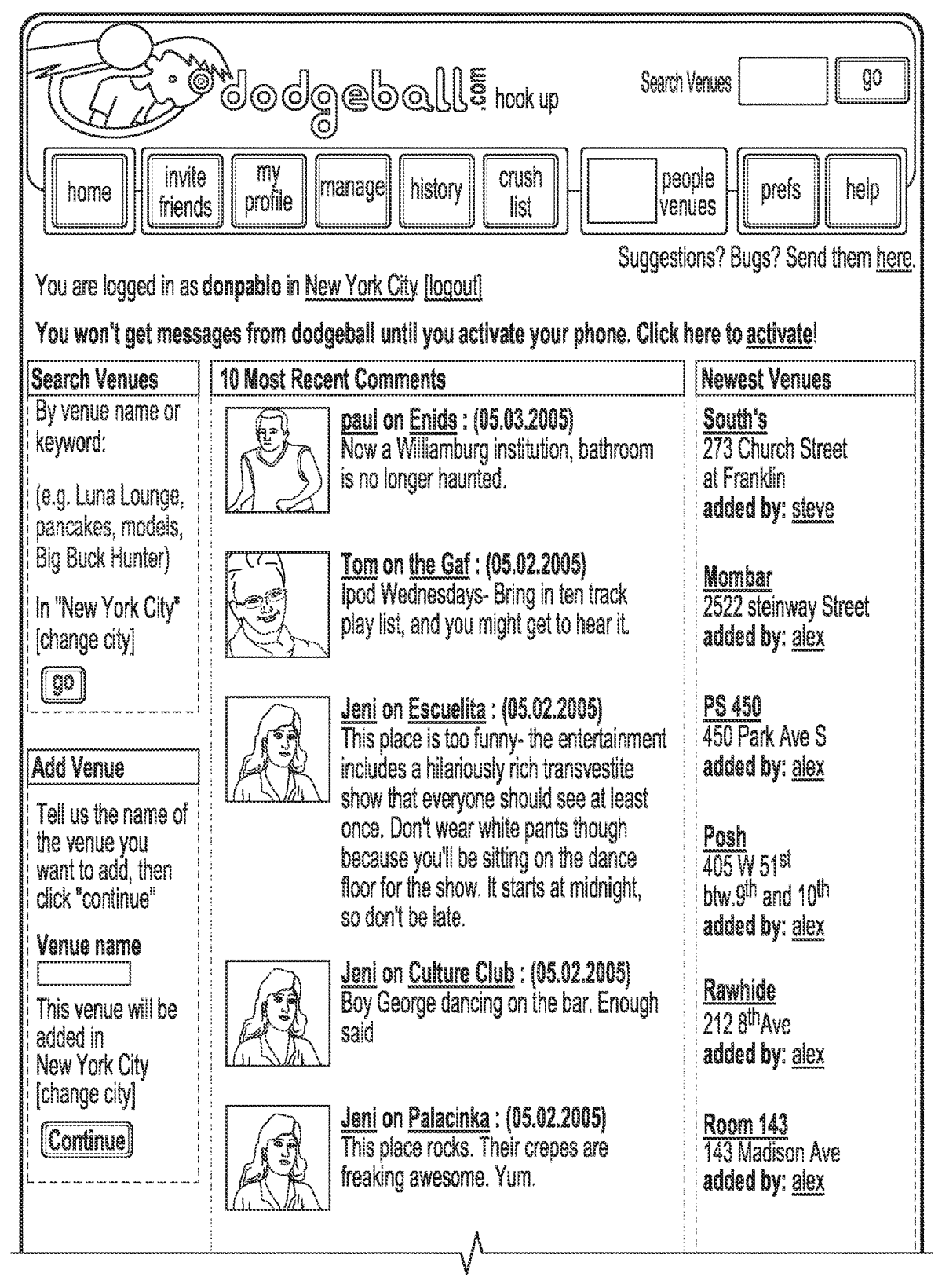

FIG. 15 is a screen shot of a venue screen. This screen includes a search box in which users can enter venue names to search for information on the venues. Users may also add a venue, and may add comments or reviews for the venue. The comments may be free-form, or may follow a pre-defined format. For example, reviews of restaurants may include pre-set rating scales for taste, service, ambiance, and price, as examples, and may also include a spot for a full textual review. The most recent reviews of any venue may also be displayed initially in the center of the screen, along with pictures of, and links to the profiles of, the users who completed the reviews. An area to the right displays the names and contact information for venues that have been added recently to the system.

Figure 16:
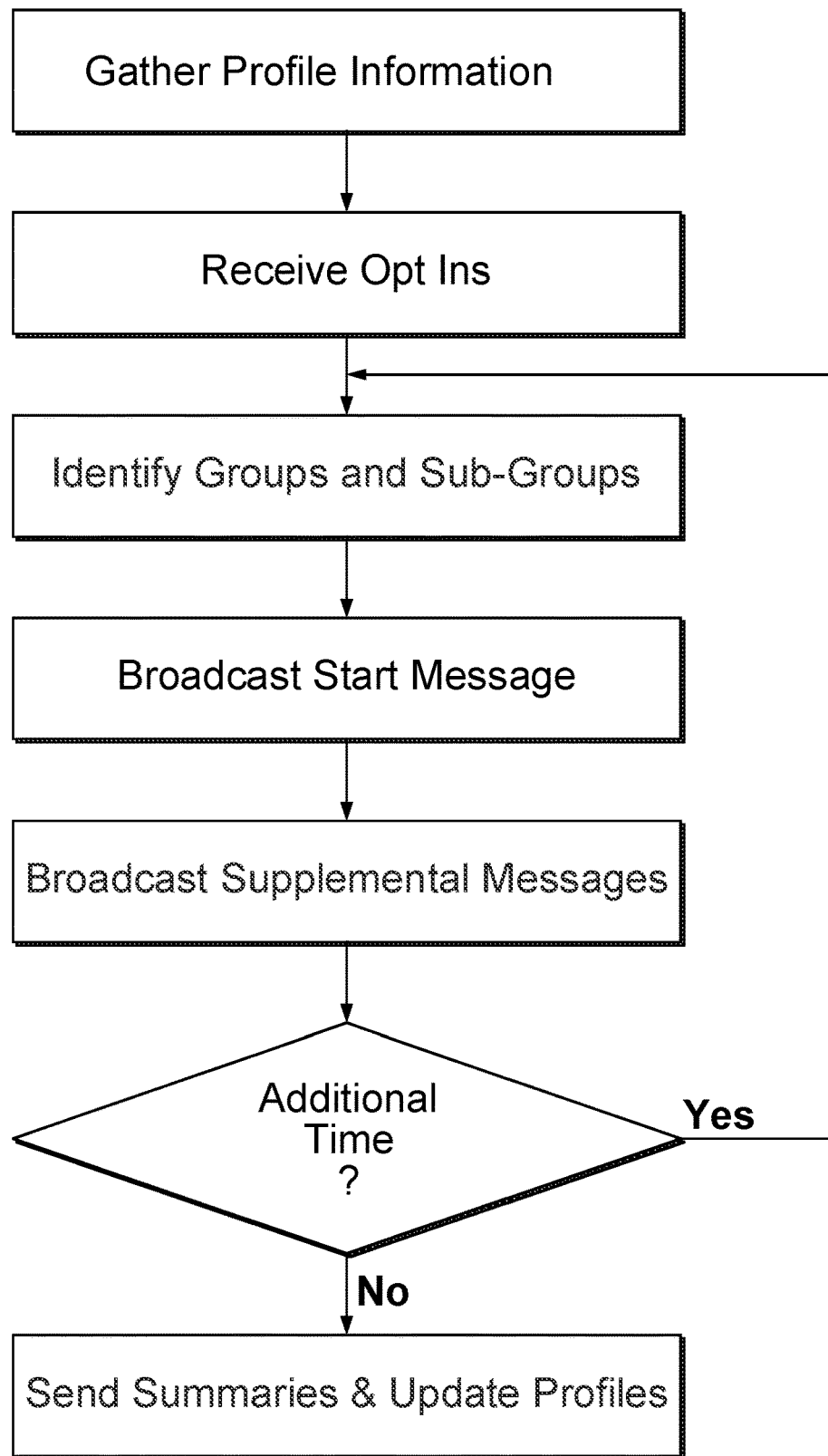
FIG. 16 is a flow chart of a system-directed social session.
Like reference symbols in the various drawings indicate like elements.

FIG. 16 is a flow chart of a system-directed social session. In this process, the server takes a more active role than that discussed above, acting much like a square dance caller. In general, the system identifies all active users in an area who have recently signaled their intent to opt into the square dance event. For example, users may send a message like: "join@Luna Lounge," which will indicate they want to join the event, and also indicate the general area in which they are located. The system may then iteratively identify commonalities among sub-groups of users in a particular area who want to play, and send users with commonalities to a single venue for a period of time. The system may simply send the users to a location and then remain silent, letting the users try to discover what they have in common. Or the system may identify the common characteristic through messages to the users, and then suggest topics of conversation, or otherwise provide suggestions or assistance in making the group's social interaction better. In this manner, the system may act as an active catalyst for group social interaction.

In the flow chart, the system first gathers profile information for users (box 200). Such gathering may occur when the users sign up with a service and fill out profile information, such as hobbies or other interests. The information may also come from analysis of venues at which the user has identified himself or herself in the recent past. In addition, the profile information may be derived, when permission is granted by the user, from other activities of the user such as search requests made to a search engine, or by an analysis of a user's recent e-mail activity. Again, such analysis would depend on first obtaining the user's permission.

A square dance event may then be scheduled. For example, there may be a standing event that begins in one locality or even nationwide, such as on Tuesday nights at 8 p.m. local time. Also, organizations such as groups of bars, restaurants, coffee houses, or museums may organize an event and may register the event with the system. The organizations may then promote the event, and may also receive assistance from the system in promoting the event. For example, the system may send messages notifying users who have used local venues about the event, or may include the event on a schedule of events at the system web site. Appropriately-tailored promotional materials or advertising targeted to the particular users or to the type of event may also be provided to users in messages or at the web site using known mechanisms for delivering promotional and advertising content. A group of users may also band together and schedule their own event or events.

At some time before the event starts (or even during the event), the system may receive opt ins from users (box 202). The opt in messages, as shown above, may include for example, a "join" command, an "@" command, and a location for the user (such as a venue name). As opt ins arrive, the system may keep track of the number of active users in a particular area. As the time for the event approaches, the system may analyze the number of users in an area, and if the number is too low for an effective event, may cancel the event by sending cancellation messages to all active users in the area, may simply instruct the active users to go to a particular venue or venues if they want to meet other active users, or may instruct the users to move to another area in which it has been determined that there are enough active users to hold an effective event.

As the time for the start of the event comes very close, the system may then identify groups and sub-groups among the active users for the event. Groups may be identified, for example, according to geographic location. For example, there may be a group bounded by a downtown area and another group bounded by an uptown or suburban area. Generally, the geographic size of the area will be kept small, particularly if bars or similar establishments are involved, so that all venues can be reached by walking.

The sub-groups may be identified from active users within a group. The sub-groups may be selected based on any appropriate measure of affinity or commonality that will make for an interested group of people. For example, all active users who have identified themselves as viewing a particular movie may be placed in a group. Also, users having similar political or artistic viewpoints may be placed together. Other known measures for determining affinity or commonality may also be used (such as those used by dating systems), and the particular selection method is not critical. For example, users may identify themselves with a particular (e.g., favorite) brand (and perhaps subjective attributes associated with the brand) and thereby receive advertising and messages from the brand or the brand's proxy (e.g., "Tell Absolut where you are and they'll tell you the closest after-hours party" or "sign up for the FlavorPill art channel and learn of new gallery openings").

In this discussion, a distinction can be drawn between and among "channels," which may represent certain affinity interests only; "groups," which are user-created and allow opt in and opt out by users; and "sets," such as sets of friends, where only the user can drop other users from the set.

When the time for the event arrives, the system may broadcast start messages to all the users (box 206). For example, each active user may simply get a message telling them to go to a particular venue in the area. Users may then attempt to identify each other when they get to the venue, or they may be provided a particular area in which to meet by the operator of the venue. For example, a table or discussion area may be marked off for participants in the square dance event. When they all are at the venue, which may take a number of minutes if the area is as large as ten blocks, the users may begin socializing. For example, they may begin, under rules of the event that may be made known to players, to determine why they have been placed together. In such a situation, the system should be established to select a commonality that is discernable by the users. Venues may organize to provide a prize to any groups that can solve their problem in a particular time period—for example, free refreshments. The possibility of such prizes could entice more users to participate in the event, and to make participants more active in their socializing.

The system may also provide the users with supplemental messages (box 208), typically with all users in one venue receiving the same supplemental message. For example, where the users are not told their commonality, the system may provide them with periodic hints. Alternatively, the system may provide proposed discussion topics for the group, perhaps based on the common feature or features of the group. For example, for a group in which all the members grew up in rural regions, the system may transmit a topic of: "Is life better on the farm or in the city?" For a group that viewed certain movies in the recent past, the system may ask the members to debate the strengths and weaknesses of the two movies. For a group at a particular installation in a museum, the system may ask questions about which painting is more pleasing.

The event may have multiple rounds. For example, an event may last an evening, but each round may last, for example, one hour, with discussion occurring for forty-five minutes and "transitions" occurring for fifteen minutes. Other appropriate time periods may also be employed. Thus, when one round is finished, the system may check to determine whether there is time for another round (box 210). If there is, a new round may be organized and presented by sending out messages telling each of the users of their next venue. If there is not time, the system may send summaries of the event and update user profiles (box 212). For example, each user may receive their score if the event is scored, and may receive their position among the users. In addition, each user may receive a "lead" report containing information about other users they met during the event—if the other users indicated their assent to sharing information. For example, when a round is over, and during a transition, screen names for each user in a group may be displayed on the users' devices, and the users may be given the opportunity to identify the other users with whom they would like to follow up. Organizers of the event may also be provided summary information, and users' profiles may be updated, such as to reflect the venues in which they met and other appropriate information.

In addition, provision may be made for users who want to "peel out" or move "off the grid" during an event. For example, two users may really hit it off, and might not want to continue with the event. They may be provided with a command that allows them to be taken out of the event. In this manner, the event can shrink slightly in later rounds without the danger of some groups becoming needlessly small (due to peel outs of which the system is unaware). The system may also require users to make a periodic positive response, such as at each round, to ensure each user is still participating in the event.

The event may also be scored, apart from awards for individual sub-groups. For example, users in a subgroup may receive points if they guess their commonality quickly (with points decreasing with ticks on the clock or use of hints). Because users "scramble" or "transition" periodically, few users will be in all the same sub-groups together. Thus, each user may receive a score equal to the scores of all the sub-groups in which the user participated (or as an average of the sub-groups). At the end of the event, awards may be given to the top scorers. An awards ceremony may even be held, with a recap of the event. For example, where the event happens weekly, each venue in an group of venues may be given the responsibility to host the recap party each week. Again, this provides additional benefits for the venues to get involved, and provides additional promotion for the system.

This process is meant to be exemplary only, and may be expanded in any number of appropriate manners. For example, venues can sign up with the service to sponsor a square dance, such as on nights that are slow. These venues need not be just bars—they could also include museums, coffee houses, or restaurants (which might serve appropriate appetizers for such an event).

This square dance process may, in particular embodiments, provide additional social activities for users, and additional commercial possibilities for sponsors. Advertising may be provided to the users on their mobile devices, and such messages may be customized, such as according to the type of venue in which the users meet, or the topic that the users have in common.

The various embodiments described herein may also be accompanied by other services for users. For example, additional messages such as promotional or advertising messages may be provided to users. Such messages may be targeted in various ways to be particularly helpful to users also. For example, venues may be associated with particular concepts or key words, so that when a user opts in from a venue, the system may provide messages associated with the key words or concepts for the venue. For example, where the venue is a bar, the user may be provided information about promotions at the bar or at nearby competing bars, or could also be provided with a promotion for a particular brand of alcohol. The messages may also act like coupons for users. For example, venues may have connections to certain advertisers, and a user may show a bartender, for example, an ad on their telephone, which the bartender may clear using an identification number unique to the venue, and may thereby register with a system the fact that the venue honored the coupon. As such, the advertiser may then rebate or provide a certain amount of money to the venue.

Other modes of transmitting advertising or promotional material may also be employed. For example, advertisers could sponsor certain venues, events, or other objects, e.g., "opt in to be friends w/Absolut". Exclusive memberships may also be provided to users, and members may be provided with special "inside" information, e.g., "pay to be part of the Flavorpill group and find out about exclusive parties." Channels may also be provided, to which users may subscribe (e.g., "lower east side deals"), and advertisers may purchase ads on the channels (e.g., through a self-service model such as Google AdSense). The advertisers could also select criteria on which to ping users, e.g., "All users within 10 blocks of X on Sunday between three and six p.m. that match this demographic/psychographic profile."

A number of embodiments of the invention have been described. Nevertheless, it will be understood that various modifications may be made without departing from the spirit and scope of the invention. For example, SMS messaging can be replaced with other sorts of messaging, and can be augmented in various ways, such as with graphical elements. Accordingly, other embodiments are within the scope of the following claims.

What is claimed is:

1. A method for communicating location information to a device, comprising:
    receiving, at a computer system that implements a social networking service, an electronic message from a device associated with a first user;
    associating, by the computer system, the received message with a profile associated with the first user and maintained by the social networking service, the profile identifying other users who are acquaintances in the social network of the first user;
    identifying devices of other users who are identified as being acquaintances of the first user;
    generating, based at least in part on the received electronic message from the first user, a message that includes one or more response options, wherein each of the one or more response options is selectable by a user and in response to a selection by a user, generates a response option for the user;
    sending, from the computer system that implements the social networking service and to devices of the other users, the message that is generated based at least in part on the received electronic message from the first user;
    receiving, from a device of an other user that received the message, a respective response message generated in response the other user selecting a response option in the message; and
    sending, to at least the device of the first user, the response message for display on the device.

2. The method of claim 1, wherein the one or more response options include a preformatted response.

3. The method of claim 1, wherein the one or more response options include a reply message interface to allow a user to type a reply message.

4. The method of claim 3, wherein the response message is a reply message typed by the other user.

5. The method of claim 1, further comprising:
    receiving, from device of yet other users that received the message, respective response messages generated in response the other users selecting a response option in the message; and
    wherein the response messages are sent to other users for display in chronological order with other messages sent to the other users from others of their acquaintances.

6. The method of claim 1, wherein the one or more response options is displayed a selectable button.

7. The method of claim 1, wherein the one or more response options include:
    a reply message interface to allow a user to type a reply message; and
    a preformatted reply displayed as a selectable button.

8. A computer system, comprising:
    one or more computers; and
    one or more tangible, non-transitory machine-readable media having recorded thereon instructions, that when executed by the one or more computers, perform operations comprising:
        receiving, at the computer system that implements a social networking service, an electronic message from a device associated with a first user;
        associating, by the computer system, the received message with a profile associated with the first user and maintained by the social networking service, the profile identifying other users who are acquaintances in the social network of the first user;

identifying devices of other users who are identified as being acquaintances of the first user;

generating, based at least in part on the received electronic message from the first user, a message that includes one or more response options, wherein each of the one or more response options is selectable by a user and in response to a selection by a user, generates a response option for the user;

sending, from the computer system that implements the social networking service and to devices of the other users, the message that is generated based at least in part on the received electronic message from the first user;

receiving, from a device of an other user that received the message, a respective response message generated in response the other user selecting a response option in the message; and sending, to at least the device of the first user, the response message for display on the device.

9. The computer system of claim 8, wherein the one or more response options include a preformatted response.

10. The computer system of claim 8, wherein the one or more response options include a reply message interface to allow a user to type a reply message.

11. The computer system of claim 10, wherein the response message is a reply message typed by the other user.

12. The computer system of claim 8, further comprising:
receiving, from device of yet other users that received the message, respective response messages generated in response the other users selecting a response option in the message; and
wherein the response messages are sent to other users for display in chronological order with other messages sent to the other users from others of their acquaintances.

13. The computer system of claim 8, wherein the one or more response options is displayed a selectable button.

14. The computer system of claim 8, wherein the one or more response options include:
a reply message interface to allow a user to type a reply message; and
a preformatted reply displayed as a selectable button.

15. One or more non-transitory, tangible machine-readable media having recorded thereon instructions, that when executed by one or more computer processors, perform operations comprises:
receiving, at the computer system that implements a social networking service, an electronic message from a device associated with a first user;
associating, by the computer system, the received message with a profile associated with the first user and maintained by the social networking service, the profile identifying other users who are acquaintances in the social network of the first user;
identifying devices of other users who are identified as being acquaintances of the first user;
generating, based at least in part on the received electronic message from the first user, a message that includes one or more response options, wherein each of the one or more response options is selectable by a user and in response to a selection by a user, generates a response option for the user;
sending, from the computer system that implements the social networking service and to devices of the other users, the message that is generated based at least in part on the received electronic message from the first user;
receiving, from a device of an other user that received the message, a respective response message generated in response the other user selecting a response option in the message; and
sending, to at least the device of the first user, the response message for display on the device.

* * * * *